United States Patent
Tomici et al.

(10) Patent No.: US 9,526,056 B2
(45) Date of Patent: Dec. 20, 2016

(54) METHOD AND APPARATUS FOR OFFLOADING BACKHAUL TRAFFIC

(71) Applicant: InterDigital Patent Holdings, Inc., Wilmington, DE (US)

(72) Inventors: John L. Tomici, Southold, NY (US); Prabhakar R. Chitrapu, Blue Bell, PA (US); Ayaskant Rath, San Jose, CA (US); Angelo A. Cuffaro, Laval (CA); Brian G. Kiernan, Downingtown, PA (US); Joseph M. Murray, Schwenksville, PA (US); Ravikumar V. Pragada, Collegeville, PA (US); Alexander Reznik, Titusville, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/387,233

(22) PCT Filed: Mar. 15, 2013

(86) PCT No.: PCT/US2013/032345
§ 371 (c)(1),
(2) Date: Sep. 22, 2014

(87) PCT Pub. No.: WO2013/142361
PCT Pub. Date: Sep. 26, 2013

(65) Prior Publication Data
US 2015/0045032 A1 Feb. 12, 2015

Related U.S. Application Data

(60) Provisional application No. 61/614,325, filed on Mar. 22, 2012, provisional application No. 61/764,758, filed on Feb. 14, 2013.

(51) Int. Cl.
*H04W 88/04* (2009.01)
*H04W 36/22* (2009.01)
(Continued)

(52) U.S. Cl.
CPC .............. *H04W 36/22* (2013.01); *H04W 28/08* (2013.01); *H04W 36/04* (2013.01); *H04W 88/04* (2013.01); *H04W 92/18* (2013.01); *H04W 92/20* (2013.01)

(58) Field of Classification Search
CPC ...... H04W 36/30; H04W 36/18; H04W 36/08; H04W 36/14; H04W 36/12; H04W 28/08; H04W 88/04; H04W 92/18; H04W 92/20
See application file for complete search history.

(56) References Cited

U.S. PATENT DOCUMENTS 8,103,310 B1 * 1/2012 Srinivas ............ H04W 28/0247
370/329
8,179,811 B2 5/2012 Tinnakornsrisuphap et al.
(Continued)

FOREIGN PATENT DOCUMENTS

JP 2010-154150 A 7/2010
JP 2010-529787 A 8/2010
(Continued)

OTHER PUBLICATIONS

WO 2011088901, Hybrid Home Node B, Jul. 28, 201, Raaf et al.*
(Continued)

*Primary Examiner* — Ted Wang
(74) *Attorney, Agent, or Firm* — Condo Roccia Koptiw LLP

(57) ABSTRACT

A method and apparatus for offloading backhaul traffic are disclosed. A first base station may detect a condition triggering backhaul traffic offloading for a wireless transmit/ receive unit (WTRU). The first base station may establish a
(Continued)

wireless connection with a second base station, and offload at least one bearer of the WTRU onto the second base station via the wireless connection. The first base station may be a macro-cell base station and the second base station may be a femto-cell base station having a wired connection to Internet and a mobile operator core network. The first or second base station may include a relay functionality and act as a relay between the WTRU and the other base station. The backhaul link may be established using a Uu, Un, X2 interface or any other interface over a licensed or license-exempt frequency, a TV white space frequency, etc.

20 Claims, 20 Drawing Sheets

(51) Int. Cl.
*H04W 36/04* (2009.01)
*H04W 28/08* (2009.01)
*H04W 92/18* (2009.01)
*H04W 92/20* (2009.01)

(56) References Cited

U.S. PATENT DOCUMENTS

| | | | |
|---|---|---|---|
| 2010/0316096 A1* | 12/2010 | Adjakple | H04L 1/1887 375/211 |
| 2013/0021978 A1 | 1/2013 | Tamura et al. | |
| 2013/0210431 A1 | 8/2013 | Abe et al. | |

FOREIGN PATENT DOCUMENTS

| | | |
|---|---|---|
| JP | 2011-077683 A | 4/2011 |
| JP | 2012-039168 A | 2/2012 |
| JP | 2012-044286 A | 3/2012 |
| KR | 10-2012-0017470 A | 2/2012 |
| WO | WO 2010/093979 A2 | 8/2010 |
| WO | WO 2010/148086 A2 | 12/2010 |
| WO | WO 2011/142175 A1 | 11/2011 |
| WO | WO 2012/008739 A2 | 1/2012 |

OTHER PUBLICATIONS

WO 2011116240, Method and Appratus for Best-Effort Radio Backhaul Among Cells on Unlicensed or Shared Spectrum, Sep. 22, 2011, Gaal et al.*

3rd Generation Partnership Project (3GPP), R3-101559, "Analysis of Supporting the X2 Interface for HeNBs", Qualcomm Incorporated, 3GPP TSG-RAN WG3 #68, Montreal, Canada, May 10-14, 2009, pp. 1-5.

3rd Generation Partnership Project (3GPP), TR 36.806 V9.0.0, "3GPP TSG-RAN (E-UTRA), Relay Architectures for E-UTRA (LTE-Advanced) Release 9", Mar. 2010, 34 pages.

3rd Generation Partnership Project (3GPP), TS 23.830 V9.0.0, "3GPP TSG-SA, Architecture Aspects of Home NodeB and Home eNodeB (Release 9)", Sep. 2009, 55 pages.

3rd Generation Partnership Project (3GPP), TS 36.300 V10.9.0, "3GPP TSG-RAN, E-UTRAN, Overall Description, Stage 2 (Release 10)", Dec. 2012, 194 pages.

3rd Generation Partnership Project (3GPP), TS 36.420 V10.2.0, "3GPP TSG-RAN (E-UTRAN), X2 General Aspects and Principles (Release 10)", Sep. 2011, 12 pages.

3rd Generation Partnership Project (3GPP), TS 36.421 V10.0.1, "3GPP TSG-RAN, E-UTRAN X2 Layer 1 (Release 10)", Mar. 2011, 6 pages.

3rd Generation Partnership Project (3GPP), TS 36.422, "3GPP TSG-RAN, E-UTRAN X2 Signaling Transport (Release 10)", Jun. 2011, 8 pages.

3rd Generation Partnership Project (3GPP), TS 36.423, "3GPP TSG-RAN, E-UTRAN X2 Application Protocol (X2AP)(Release 10)", Mar. 2012, 132 pages.

3rd Generation Partnership Project (3GPP), TS 36.424, "3GPP TSG-RAN, E-UTRAN X2 Data Transport (Release 9)", Mar. 2011, 8 pages.

Cisco, "Cisco Visual Networking Index: Global Mobile Data Traffic Forecast Update", Available at http://www.cisco.com/c/en/us/solutions/collateral/service-provider/visual-networking-index-vni/white_paper_c11-520882.html, Feb. 3, 2009, pp. 1-42.

Claussen et al., "Financial Analysis of a Pico-Cellular Home Network Deployment", IEEE International Conference on Communications, ICC '07, Jun. 24-28, 2007, pp. 5604-5609.

Fitchard, Kevin, "Mobile Data Offload Emerging as 3G Data Core Alternative", Connected Planet, Available at http://connectedplanetonline.com/3g4g/news/mobile-data-offload-stoke-0129/, Jan. 29, 2010.

Rath et al., "FemtoHaul: Using Femtocells with Relays to Increase Macrocell Backhaul Bandwidth", IEEE Conference on Computer Communications Workshops, INFOCOM, Mar. 15-19, 2010, 5 pages.

Stoke, Inc., "Stoke Products: Ssx-3000 Overview", Available at http://www.stoke.com/Products/ssx-3000.asp.

WiMAX, "Mobile WiMAX-Part I: A Technical Overview and Performance Evaluation", WiMAX Forum, V2.8, Aug. 2006, pp. 1-53.

* cited by examiner

METHOD AND APPARATUS FOR OFFLOADING BACKHAUL TRAFFIC

CROSS REFERENCE TO RELATED APPLICATIONS

This application claims the benefit of U.S. Provisional Application Nos. 61/614,325 filed Mar. 22, 2012 and 61/764,758 filed Feb. 14, 2013, contents of which are hereby incorporated by reference herein.

BACKGROUND

The amount of wireless mobile data traffic has increased substantially. According to one study, the global mobile data traffic was about 90,000 terabytes in 2009 and it is expected to increase to 3.6 million terabytes by 2014. A portion of this mobile data would be generated and/or consumed by the mobile operator networks, such as voice, text and other value added services, such as video-on-demand, gaming etc. This would be a significant load on the mobile operator networks, including a radio access network and a core network.

With such substantial increase of the amount of the mobile data, a major challenge that the mobile networks face is the backhaul of data between the radio access network and the core network. The challenge is essentially due to the large capacity and the flexibility needed.

SUMMARY

A method and apparatus for offloading backhaul traffic are disclosed. A first base station may detect a condition that triggers backhaul traffic offloading for a wireless transmit/receive unit (WTRU) that is associated with the first base station. The first base station may establish a wireless connection with a second base station, and offload at least one bearer of the WTRU onto the second base station via the wireless connection.

The first base station may, for example, be a macro-cell base station and the second base station may, for example, be a femto-cell base station having a wired connection to Internet and a mobile operator core network, and the at least one bearer is offloaded via the wired connection of the femto-cell base station. Another example is where a femto-cell base station offloads at least one bearer via a macro-cell base station.

The first base station or the second base station may include a relay functionality and act as a relay between the WTRU and the other base station for backhaul purposes. A backhaul link may be established using a Universal Mobile Telecommunication System (UMTS) Uu or Long Term Evolution (LTE) Uu, Un, or X2 interface or any other interface over a licensed frequency, a license-exempt frequency, a TV white space frequency, or a wired interface.

The first base station may maintain mapping identifying which bearer is sent over which backhaul interface and which portion of bearers of the WTRU are offloaded onto the second base station. Each of the first base station and the second base station may be a femto-cell base station and the backhaul traffic may be offloaded via a network of a plurality of femto-cell base stations and a gateway femto-cell base station.

BRIEF DESCRIPTION OF THE DRAWINGS

A more detailed understanding may be had from the following description, given by way of example in conjunction with the accompanying drawings.

DETAILED DESCRIPTION

Figure 1A:
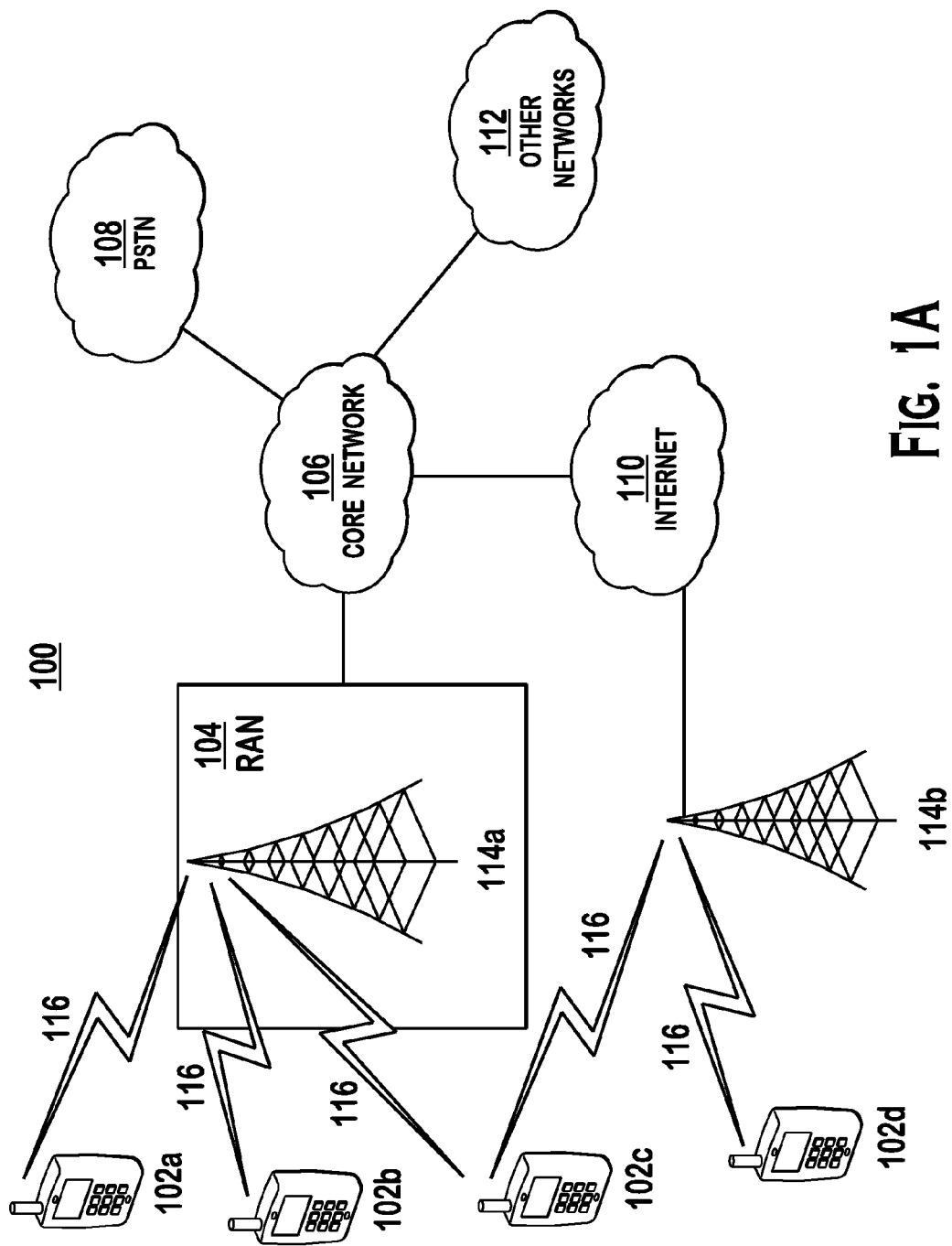
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femto-cell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
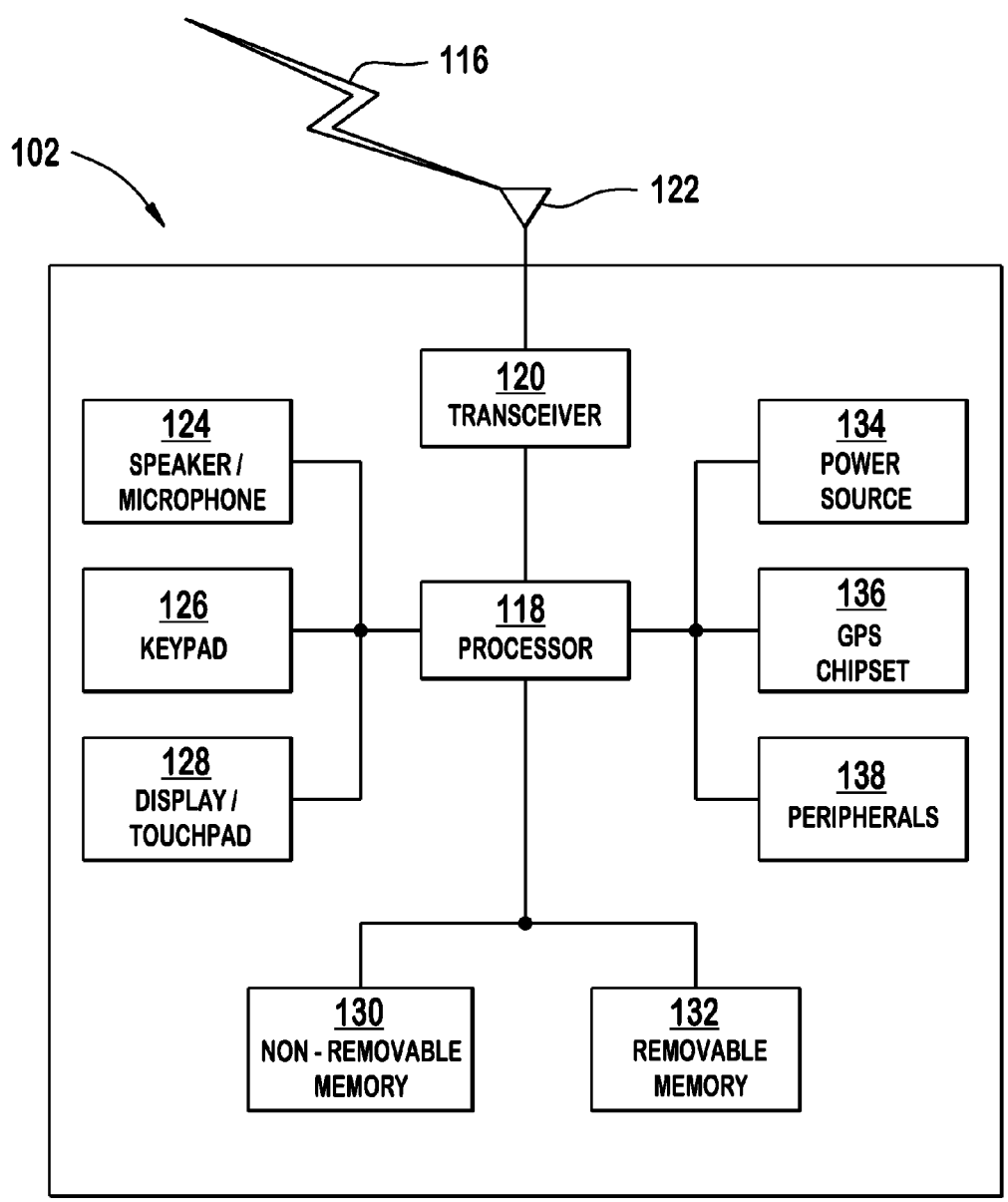
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
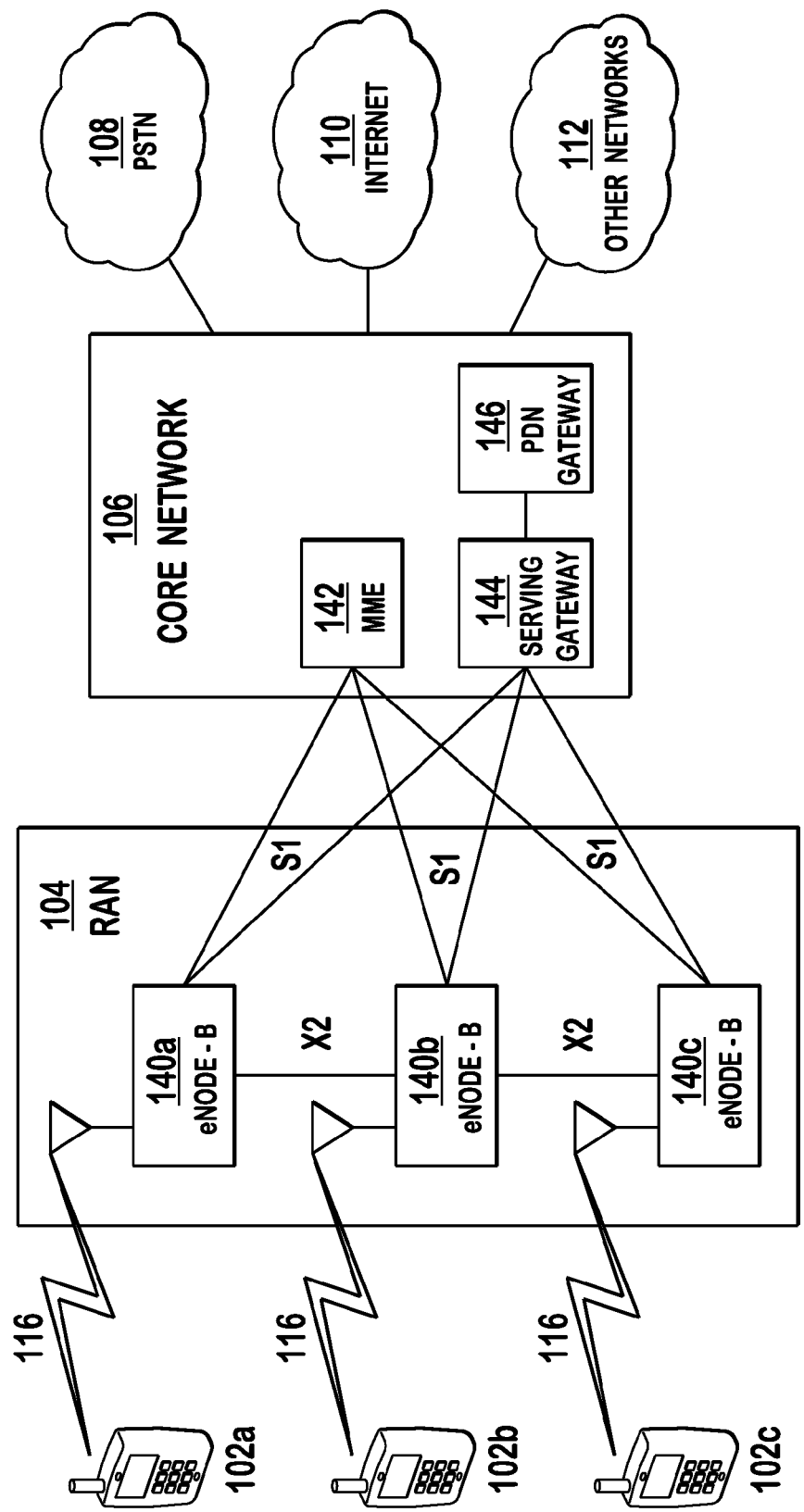
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Different types of radio access technologies (RATs) have been developed and mobile networks are evolving to a heterogeneous architecture, where macro-cells are supplemented by small cells for coverage and capacity. Typically, macro-cells are designed to provide contiguous coverage over a large geographic area, whereas the small cells are deployed on an as-needed basis, for example, to provide required capacity. Small cells may be deployed outdoors or indoors, within enterprises, shopping malls, residences, etc. The small cell access technology may be, for example, Third Generation (3G), Fourth Generation (4G), WiFi, or any technologies that currently exist or will be developed in the future, or any combination thereof.

Hereafter, the terms "small cell" and "femto-cell" will be used interchangeably, and the terms "eNB" and "macro eNB" will be used interchangeable. Hereafter, the term "eNB" or "HeNB" will be used as a representative example of a base station of a macro-cell and a femto-cell, respectively, but the embodiments disclosed herein are applicable to any base station devices that serve macro-cells or the femto-cells.

In order to address backhaul problems of mobile network operators, in one embodiment, backhaul traffic may be offloaded from one base station to another via a wireless connection between the base stations. The base stations may be macro-network base stations, such as eNBs or NodeBs, or small cell base stations, such as home eNBs (HeNBs), home NBs, WLAN access points (APs), or the like. The backhaul traffic may be offloaded, for example, between macro-network base stations, between small cell base stations, between a macro-network base station and a small cell base station or between a small cell base station and a macro-network base station. The wireless connection between the base stations may be any wireless connections, for example, WiFi, Universal Mobile Telecommunication System (UMTS) Uu or LTE Uu, Un, or X2 connections, microwave connections, or the like, and may use licensed, unlicensed, or lightly licensed spectrum (such as TV white spaces (TVWS)).

Hereafter, embodiments will be explained with reference to an LTE network architecture. However, the embodiments disclosed herein are applicable to any network architecture that currently exists or will be developed in the future. The embodiments are applicable to any other small-cell, in particular where the small-cell is operating using backhaul links different from those of the macro-cell. The embodiments are also applicable where air-interface resources are available for offloading the traffic at the source cell while the backhaul resources at the source cell are congested or provisioned to be utilized for other purposes, or the like.

In one embodiment, the backhaul traffic may be offloaded from a macro-cell to a femto-cell (or vice versa) using a UMTS or LTE Uu interface to transport traffic.

In one embodiment, the traffic may be offloaded using a WTRU as a relay. When the backhaul of a macro-cell or a femto-cell is over-utilized or served for a high priority traffic, traffic (e.g., lower priority traffic) may be offloaded via a femto-cell through a relay WTRU. The source (either macro-cell eNB or femto-cell HeNB) may choose a target cell in the region. If the source is an HeNB, the HeNB may choose one of the macro-cells that is within a range. The HeNB may be pre-configured to choose a specific macro-cell. If the source is an eNB, the eNB may choose one of the femto-cells in the region. Once the source and target cells have been determined, either or both of them may choose one of the WTRUs near the femto-cell to act as a relay WTRU. The relay WTRU may have an ongoing Uu connection with the eNB. The eNB may page for candidate relay WTRUs. The eNB may select a relay WTRU and HeNB pair by requesting that the candidate relay WTRUs report all detected femto-cells they are allowed to camp on.

Figure 2:
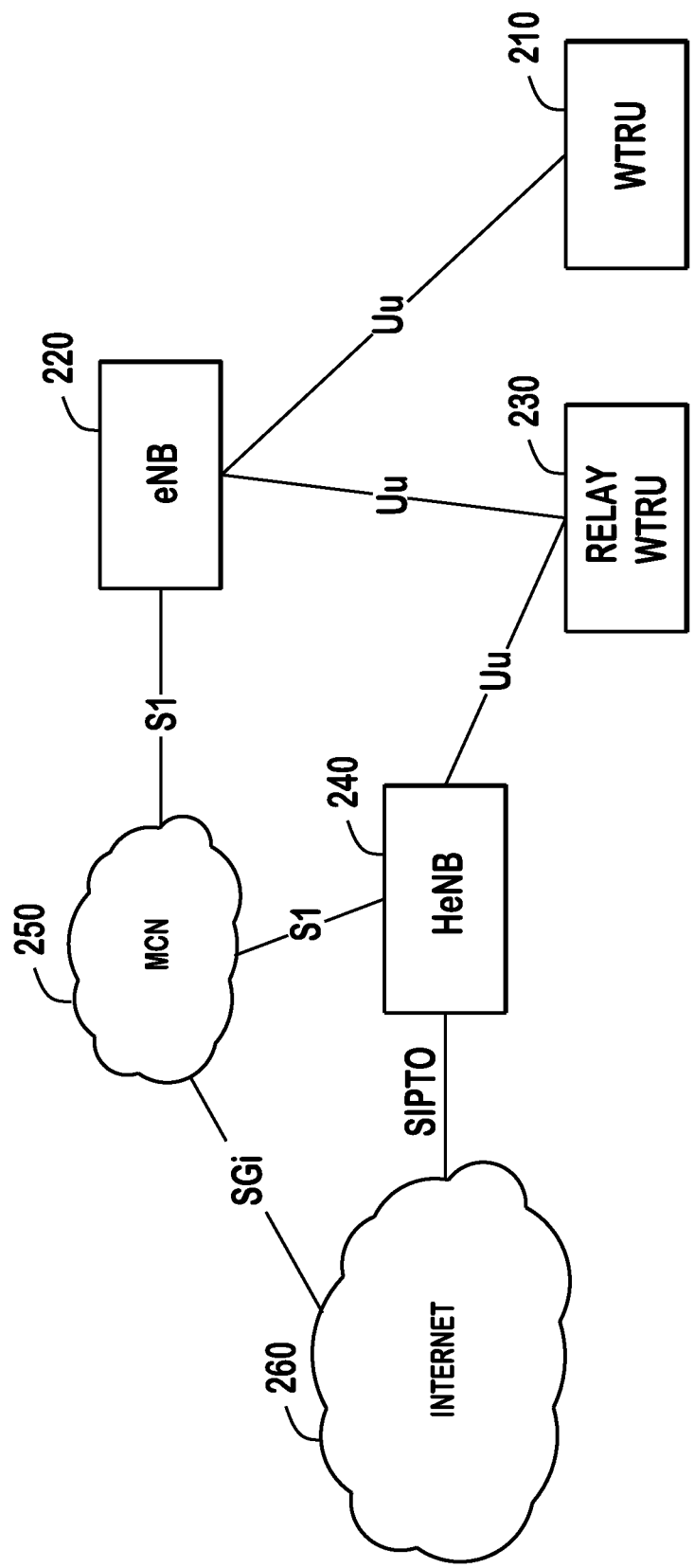
FIG. 2 shows an example network architecture for offloading traffic using a relay WTRU in accordance with one embodiment.

FIG. 2 shows an example network architecture for offloading traffic using a relay WTRU in accordance with one embodiment. A WTRU 210 is connected to an eNB 220, which is connected to the mobile core network (MCN) 250 via an S1 interface. An HeNB 240 is deployed to serve a femto-cell, and is connected to the MCN 250 and the Internet 260. In this example, the eNB 220 detects the overloading or congestion, or any other triggering condition for offloading, and decides to offload traffic of the WTRU 210 (called "served WTRU" hereafter) onto the HeNB 240 using a relay WTRU 230. The eNB 220 may select the relay WTRU 230 and send a traffic offload request to the relay WTRU 230. The relay WTRU 230 may switch its connections between the eNB 220 and the HeNB 240. The relay WTRU 230 may then make a request to the HeNB 240 via the Uu interface, and the traffic may be passed on to the backhaul of the HeNB 240 (e.g., downlink traffic is transported to the served WTRU 210 via the HeNB 240, the relay WTRU 230, and the eNB 220). The offloading may be from a macro-cell to a femto-cell, or vice versa.

Figure 3:
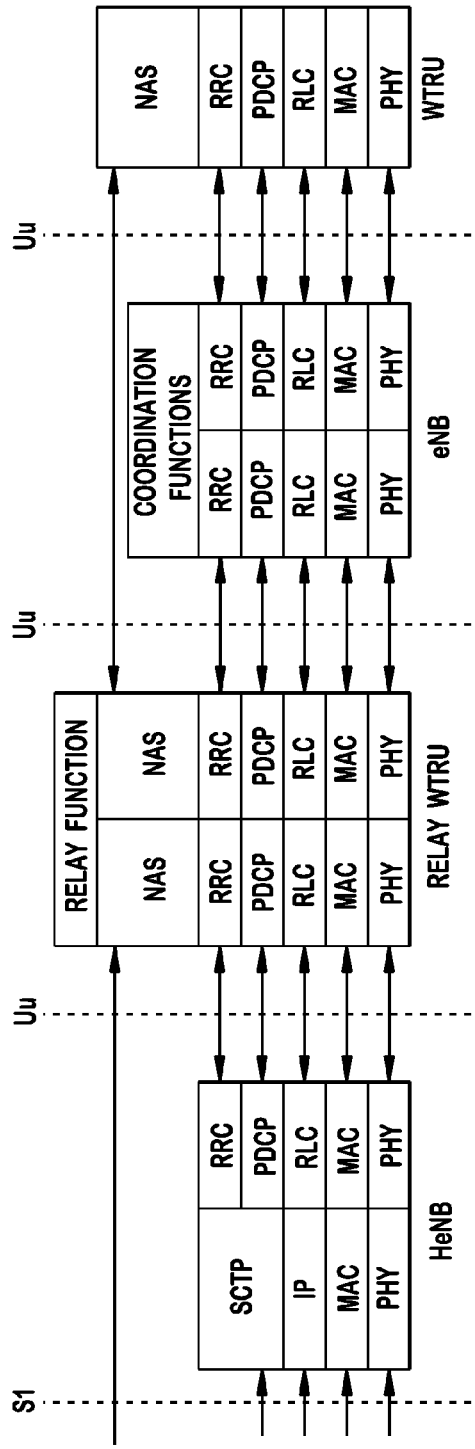
FIG. 3 shows an example control plane architecture for offloading traffic using a relay WTRU.
Figure 4:
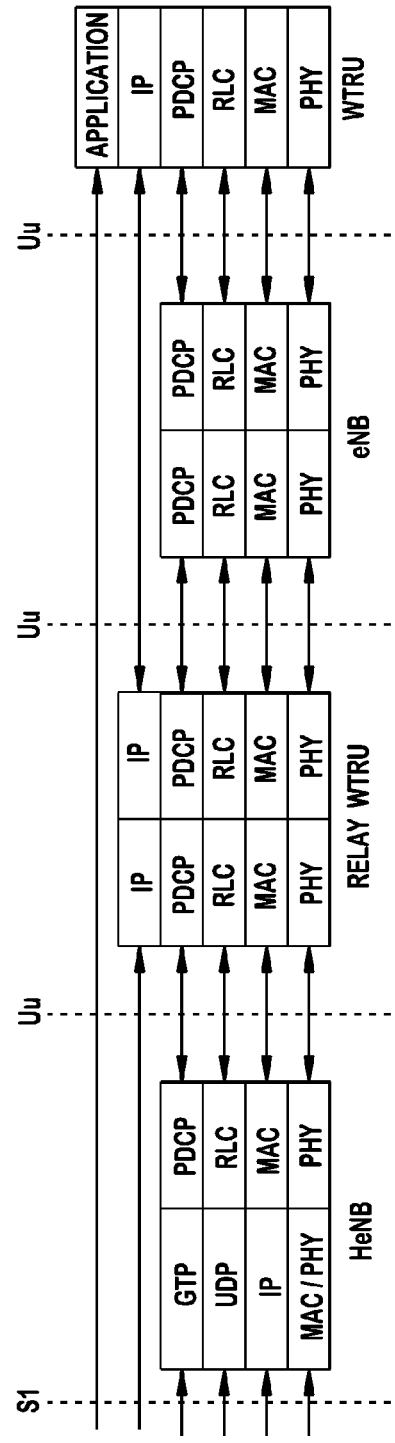
FIG. 4 shows an example user plane architecture for offloading traffic using a relay WTRU.

FIG. 3 shows an example control plane architecture for offloading traffic using a relay WTRU. FIG. 4 shows an example user plane architecture for offloading traffic using a relay WTRU. A WTRU may be modified to be able to act as a relay WTRU. A Relay WTRU should be able to forward requests between the macro eNB and the HeNB, recognize control traffic that needs to be forwarded in the reverse direction to the direction of the offload, and maintain simultaneous associations with both the eNB and the HeNB or switch between the two associations so that it can stream (forward) traffic between the HeNB and the eNB.

Figure 5:
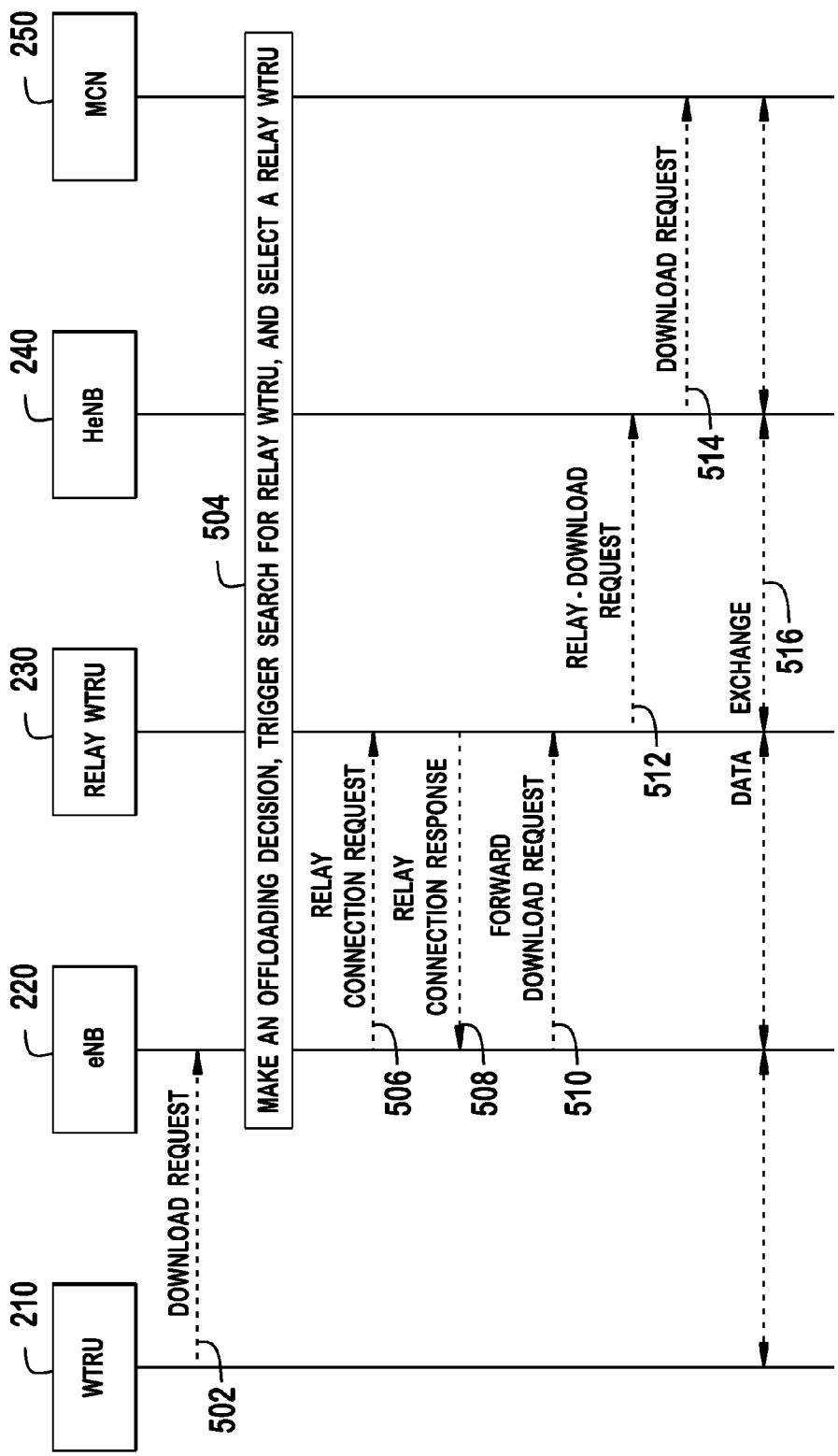
FIG. 5 is a signaling diagram of an example process of offloading traffic using a relay WTRU.

FIG. 5 is a signaling diagram of an example process of offloading traffic using a relay WTRU, such as relay WTRU 230 of FIG. 2. The served WTRU 210 sends a download request to the eNB 220 (502). An offloading decision is then made, which triggers a search for the relay WTRU 230, and the relay WTRU 230 is selected for offloading traffic for the WTRU 210 (504). The eNB 220 and the selected relay WTRU 230 set up a connection by exchanging a relay connection request and a relay connection response (506, 508). The eNB 220 then forwards the download request to the relay WTRU 230 (510), which relays the download request to the HeNB 240 to which the relay WTRU 230 is connected (512). The HeNB 240 then sends the download request to the MCN 250 (514) or via the Internet 260. The traffic data is then transported to the WTRU 210 via the HeNB 240, the relay WTRU 230, and the eNB 220 (516).

The relay WTRU contributes its resources such as bandwidth, battery, etc. to help the served WTRU. The relay WTRU may be given incentives to act as a relay WTRU. The traffic from the relay WTRU includes relayed traffic and the relay WTRU's own traffic. One of these types of traffic may be given priority. For example, the relay WTRU's own traffic may be given a higher priority than the relayed traffic for the served WTRU.

In another embodiment, an HeNB may also act as a WTRU and traffic may be offloaded onto the HeNB via a Uu connection between an eNB and the HeNB.

Figure 6:
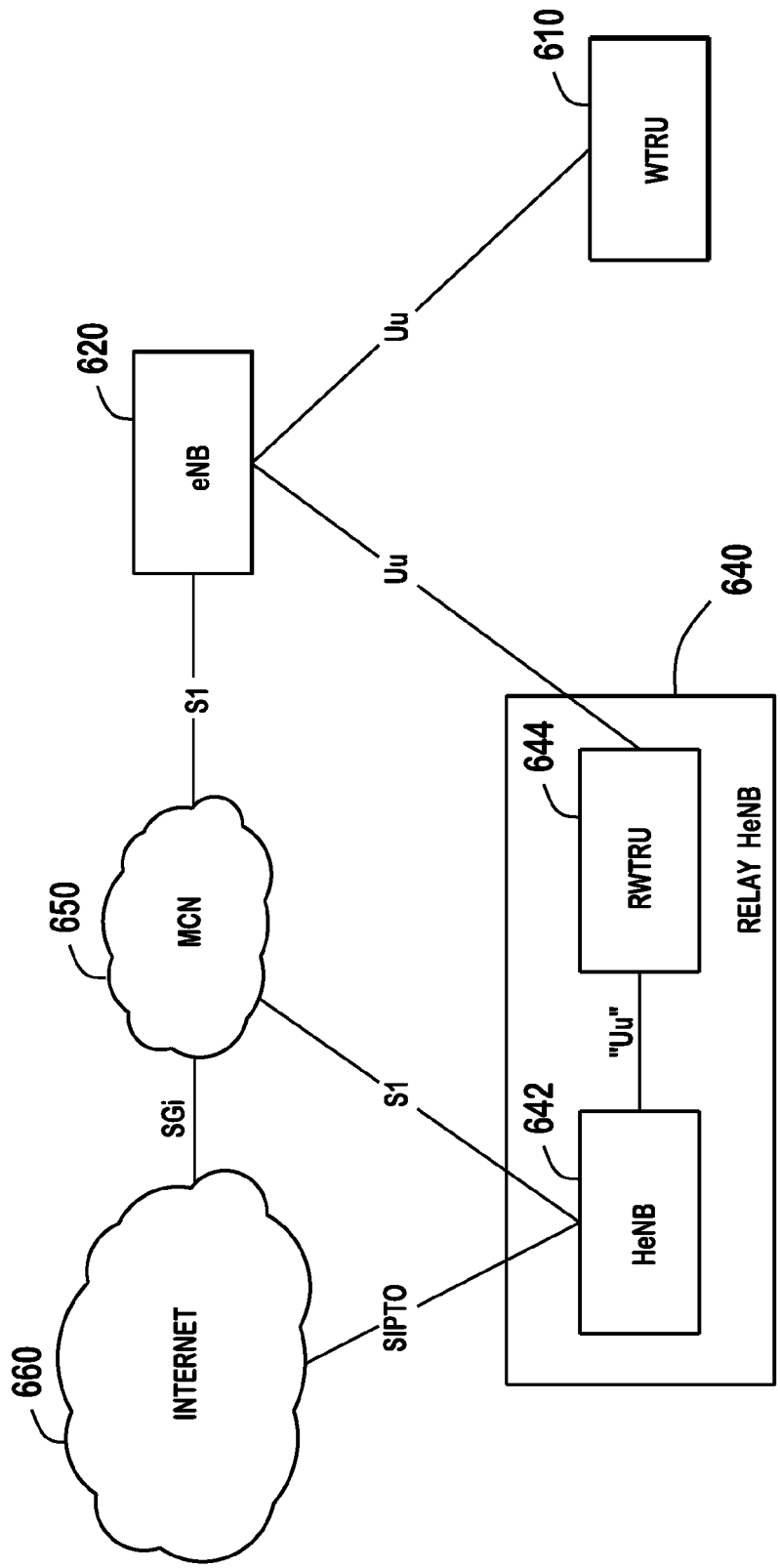
FIG. 6 shows an example network architecture for offloading traffic using a direct link over a Uu interface between an evolved NodeB (eNB) and a home evolved NodeB (HeNB) acting as a WTRU.

FIG. 6 shows an example network architecture for offloading traffic using a direct link over a Uu interface between an eNB and an HeNB acting as a WTRU. A WTRU 610 is connected to an eNB 620, which is connected to a MCN 650 via an S1 interface. A relay HeNB 640 is deployed to serve a femto-cell, and is connected to the MCN 650 and the Internet 660. The relay HeNB 640 includes an HeNB functionality 642 and a relay WTRU functionality 644 (referred to as RWTRU in FIG. 6). A direct link between the relay HeNB 640 and the eNB 620 may be established over a Uu interface. The direct link between the relay HeNB 640 and the eNB 620 may be active at all times. For example, the relay HeNB 640 (acting as a WTRU) may stay associated with the eNB 620 all the time, rather than merely when traffic offloading is actually going on. To minimize resource consumption at the relay HeNB 640 (acting as WTRU), the relay HeNB 640 may be in an idle mode when the traffic offloading is not in use.

In this example, the WTRU functionality 644 is included in, or attached to, the HeNB functionality 642 with an internal Uu interface between them. When the relay HeNB 640 serves as a relay, the relay HeNB 640 may choose to associate with the eNB 620 (via the included or attached RWTRU 644). In this way, the eNB may be aware of the potential femto-cells to offload traffic to. Alternatively, the traffic may be offloaded from the HeNB 640 onto the eNB 620.

For the HeNB 640 to be able to act as a WTRU associating itself with the eNB, modifications in its architecture may be needed. Moreover, since HeNB hardware is typically designed for small range communications, the hardware may need to be changed. Alternatively, a special WTRU may be incorporated in or attached to a regular HeNB. The RWTRU 644 may be permanently connected to the HeNB 642 through a Uu (or similar) interface.

Figure 7:
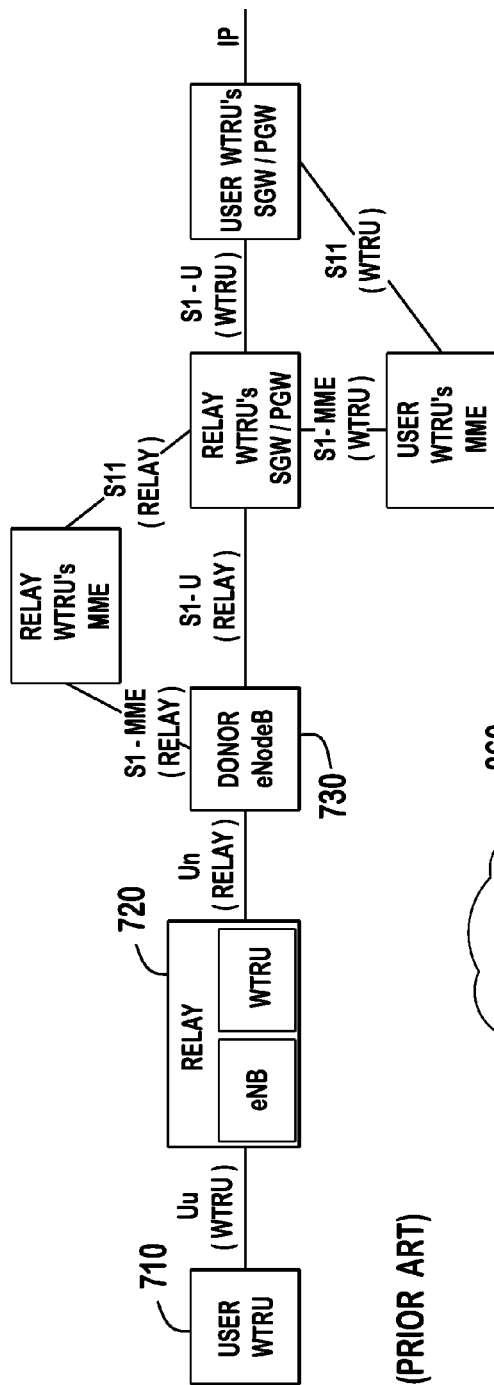
FIG. 7 shows a prior art Third Generation Partnership Project (3GPP) relay architecture.

In another embodiment, the traffic may be offloaded to/from the macro-cell via an LTE Un interface. The Un interface may be used to transport traffic between the eNB and the HeNB. The Un interface is defined in 3GPP for relay applications between a relay node (RN) and a donor eNB (DeNB). FIG. 7 shows a 3GPP relay architecture. The RN 720 is a low power base station that relays traffic between a user WTRU 710 and an eNB 730 called donor eNB (DeNB). The RN can provide enhanced coverage and capacity at cell edges and can also be used to connect to remote areas. The RN 720 is connected to the DeNB 730 via a radio interface Un, which is a modification of the air interface Uu. In the donor cell, the radio resources are shared between WTRUs served directly by the DeNB 730 and the RN 720.

Figure 8:
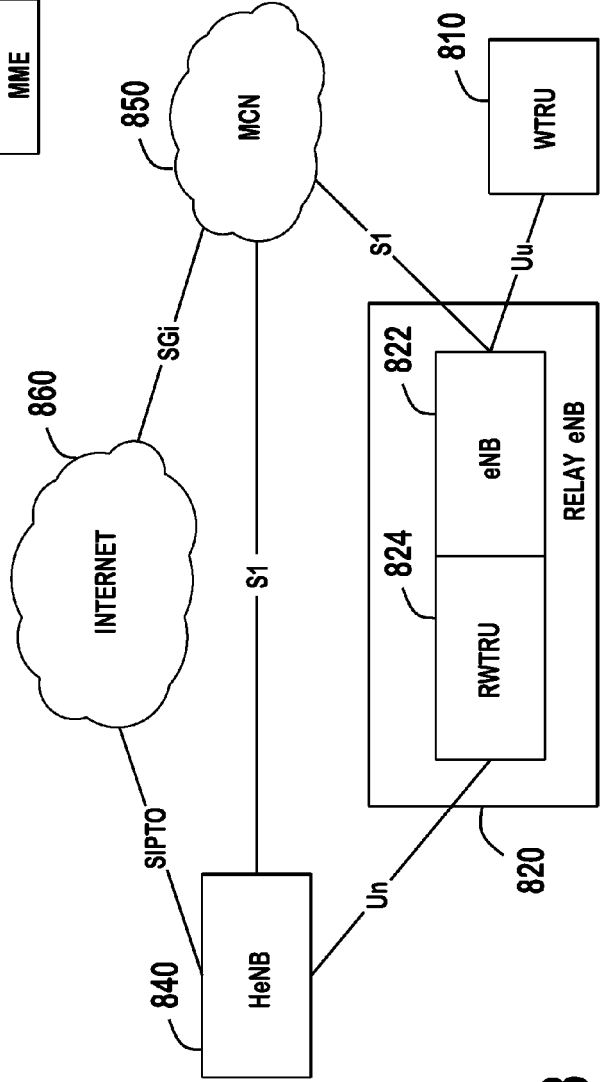
FIG. 8 shows an example network architecture for offloading traffic using a Un interface wherein an eNB acts as a relay node.

FIG. 8 shows an example network architecture for offloading traffic using a Un interface wherein the eNB acts as a relay node (RN). A WTRU 810 is connected to an eNB 820, which acts as a RN. The eNB 820 is connected to a MCN 850 via an S1 interface. An HeNB 840 is deployed to serve a femto-cell, and is connected to the MCN 850 and the Internet 860. The HeNB 840 supports the Un interface. The eNB 820 includes an eNB functionality 822 and a relay WTRU functionality 824 (referred to as RWTRU in FIG. 8). A direct link between the HeNB 840 and the eNB 820 may be established by making the eNB 820 act as a relay. The direct link between the eNB 820 and the HeNB 840 may be active at all times. When the eNB 820 chooses to offload traffic from its backhaul and chooses a target cell to offload it to, the eNB 820 may connect to the HeNB 840 through a Un interface, acting as a relay. The eNB 820 acts as a relay rather than as a donor, (e.g., the eNB 820 does not proxy the S1 signaling, instead the HeNB 840 acts as an S1 signaling proxy via its broadband connection). The eNB 820 acts as a WTRU proxy for Uu/Un radio level protocols. In this example, the eNB 820 is the source and the HeNB 840 is the target. It should be noted that offloading may be from the eNB 820 to the HeNB 840, or from the HeNB 840 to the eNB 820.

The Un interfaces between the eNB 820 and the HeNB 840 (and any potential HeNBs in the region) may be kept active at all times in order to avoid delay and wastage of resources associated with setting up a Un interface with a femto-cell for offloading. The Un interface may use either licensed or unlicensed spectrum at the physical layer. Deployment of femto-cells may take advantage of spatial reuse of frequency channels.

Once the eNB 820 and the HeNB 840 are associated, the eNB 820 may place a request for traffic in a manner analogous to normal traffic requests by a WTRU associated with a femto-cell. From a high level point of view, it would appear that the source eNB (e.g., eNB 820) proxies the original WTRU 810 it is serving by forwarding the request to a femto-cell, instead of serving the WTRU 810 by itself. To the WTRU 810, it appears as though the source eNB 820 is serving it, and to the femto-cell, it appears as though the WTRU 810 (which is actually the source eNB 820) is requesting traffic.

Figure 9:
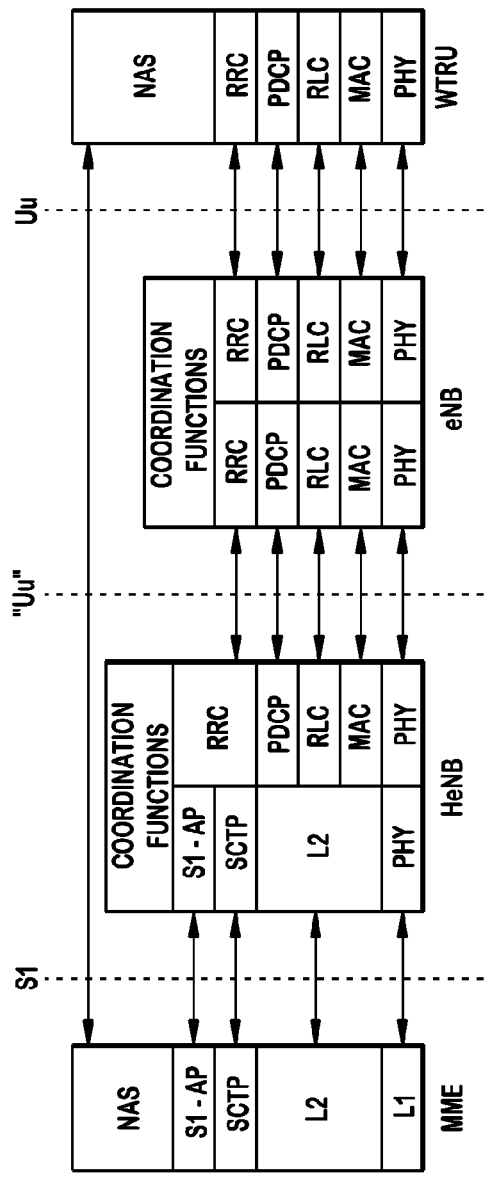
FIG. 9 shows an example control plane architecture for offloading traffic using a Un interface wherein an eNB acts as a relay node.
Figure 10:
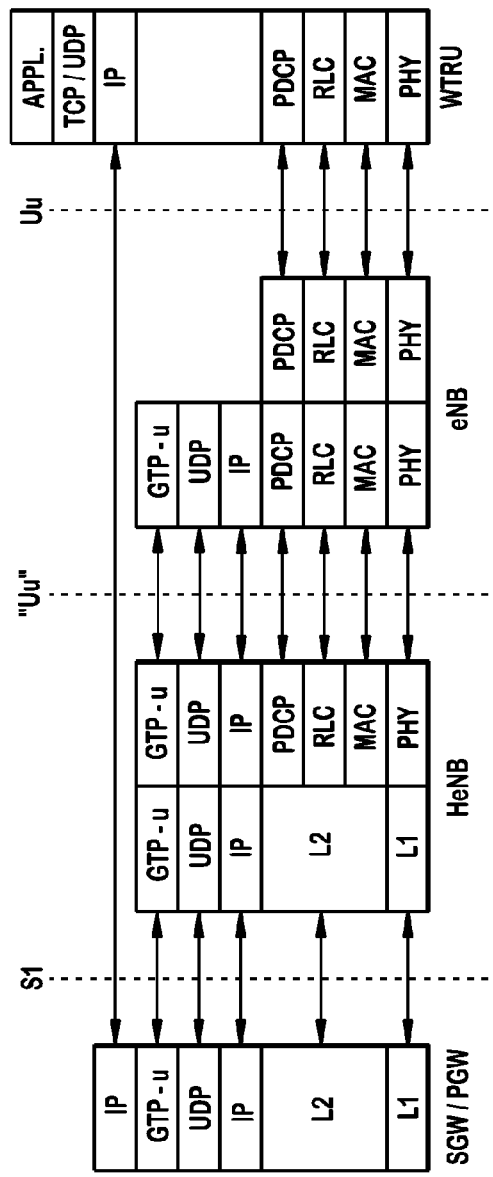
FIG. 10 shows an example user plane architecture for offloading traffic using a Un interface wherein an eNB acts as a relay node.

The network architecture in FIG. 8 may be seen as a variant of the LTE relay architecture in FIG. 7. However, the eNB 820 functions like an RN towards the WTRU 810 and as a WTRU to the DeNB, which is represented by the HeNB in FIGS. 9 and 10. FIG. 9 shows an example control plane architecture for offloading traffic using a Un interface wherein the eNB acts as a relay node. FIG. 10 shows an example user plane architecture for offloading traffic using a Un interface wherein an eNB acts as a relay node. However, the offloading may be from the eNB to a HeNB or vice versa.

Figure 11:
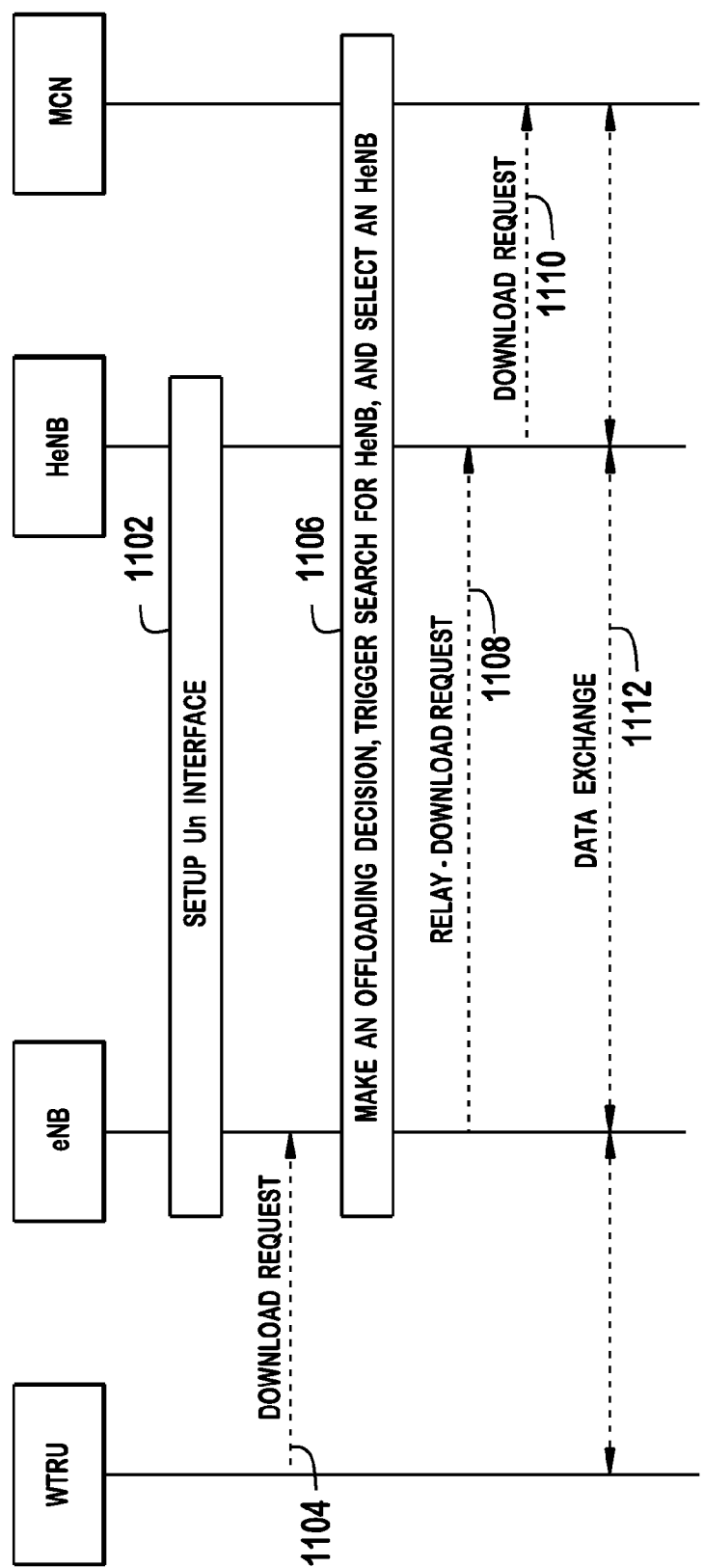
FIG. 11 is a signaling diagram of an example process of traffic offloading with a direct macro-to-femto link over a Un interface with an eNB acting as a relay node.

FIG. 11 is a signaling diagram of an example process of traffic offloading with a direct macro-to-femto link over a Un interface with an eNB acting as an RN such as depicted in FIG. 8. Initial setup procedures including setting up a Un interface between the eNB 820 and the HeNB 840 are performed (1102). The WTRU 810 sends a download request to the eNB 820 (1104). An offloading decision is made, which triggers search for an HeNB, and an HeNB is selected (such as, for example HeNB 840) for offloading (1106). The eNB 820 then sends a relay download request to the selected HeNB 840 (1108). The HeNB 840 sends a download request to the MCN 850 (1110). Data traffic is then routed to the WTRU 810 via the HeNB 840 and the eNB 820 (1112).

Figure 12:
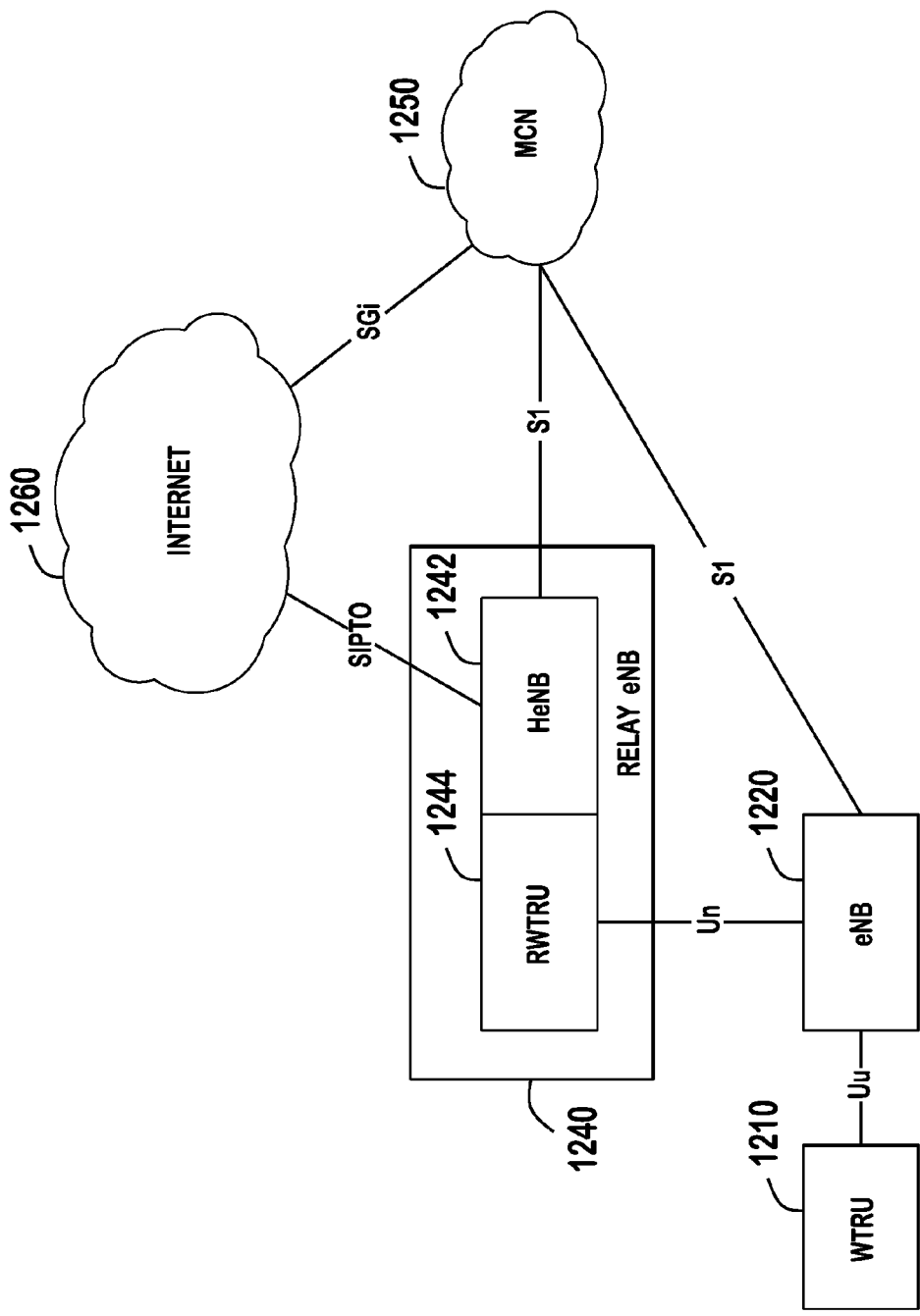
FIG. 12 shows an example network architecture for traffic offloading over Un using an HeNB acting as a relay node.

In another embodiment, the traffic offloading may be performed by using a HeNB as an RN. FIG. 12 shows an example network architecture for traffic offloading over Un using a HeNB acting as an RN that is a modification of the embodiment shown in FIG. 8.

A WTRU 1210 is connected to an eNB 1220. The eNB 1220 is connected to a MCN 1250 via an S1 interface. An HeNB 1240 is deployed to serve a femto-cell, and is connected to the MCN 1250 and the Internet 1260. The HeNB 1240 supports the Un interface and works as an RN. The HeNB 1240 includes an HeNB functionality 1242 and a relay WTRU functionality 1244 (referred to as RWTRU in FIG. 12). A direct link between the HeNB 1240 and the eNB 1220 may be established over the Un interface. The direct link between the eNB 1220 and the HeNB 1240 may be active at all times. When the eNB 1220 chooses to offload traffic from its backhaul and chooses a target cell to offload it to, the eNB 1220 may connect to the HeNB 1240 through the Un interface. The HeNB 1240 functions like the relay node in FIG. 7 with an additional S1 interface with the MCN 1250 via a broadband backhaul. It should be noted that the offloading may be from the eNB 1220 to the HeNB 1240 or from the HeNB 1240 to the eNB 1220.

Figure 13:
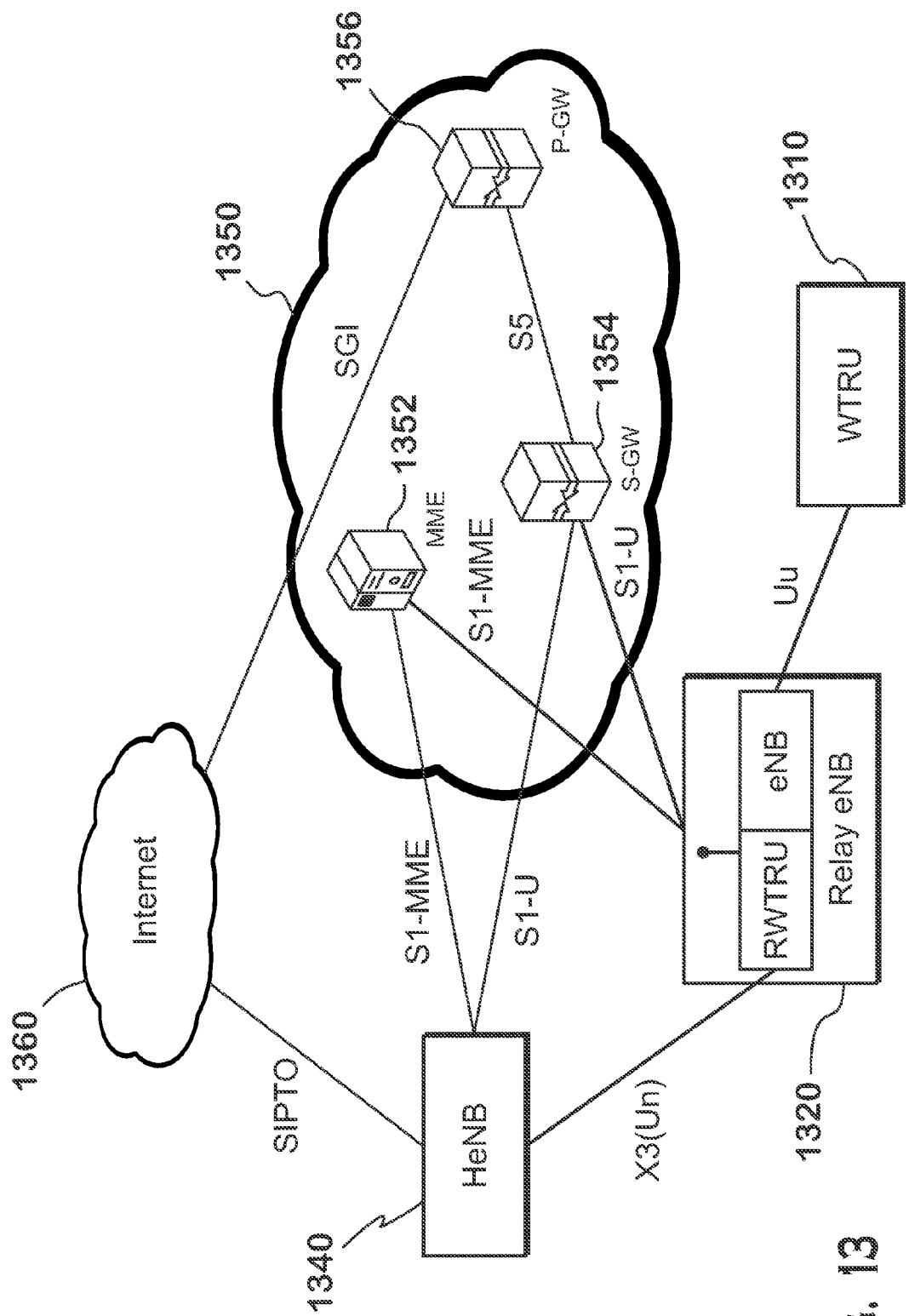
FIG. 13 shows an example network architecture for offloading traffic using a Un interface wherein an eNB acts as a relay node.

FIG. 13 shows an example network architecture for offloading traffic using a Un interface wherein an eNB acts as a relay node. In the embodiment shown in FIG. 13, a source eNB 1320 acts as a relay node and traffic is offloaded onto a HeNB 1340 using a Un interface. A WTRU 1310 is connected to the network via the source eNB 1320. The source eNB's backhaul to a mobile core network 1350 is congested or is provisioned to be utilized for higher priority traffic. The HeNB 1340 is enhanced with the support for a Un interface. The source eNB 1320 utilizes this Un interface to offload the backhaul traffic to the HeNB 1340. The offload of backhaul traffic from the source eNB 1320 to the HeNB 1340 may be transparent to the WTRU 1310.

When the WTRU 1310 enters an RRC-CONNECTED state, the eNB 1320 during its call admission procedure may determine (e.g., with support from the MME 1352 and/or the HeNB 1340) whether the traffic for this WTRU 1310 may be offloaded using the HeNB Un interface. Alternatively, at the time of bearer admission procedures (used either for establishment of a new bearer or modification of an existing bearer), the decision may be made based on negotiations between the source eNB 1320, the MME 1352, and the HeNB 1340.

A new interface, called X3 interface, that operates over the Un link between the source eNB 1320 and the HeNB 1340, may be introduced as shown in FIG. 13. The X3 interface may help setup control signaling required for setting up the GPRS Tunneling Protocol (GTP) tunnels and associated configurations in the HeNB 1340. It may help the HeNB 1340 in setting up required S1 signaling and to allow for appropriate traffic routing from the MCN 1350 to the HeNB 1340 for specific WTRUs or bearers of these specific WTRUs for which backhaul traffic is routed through the HeNB 1340.

Figure 14A:
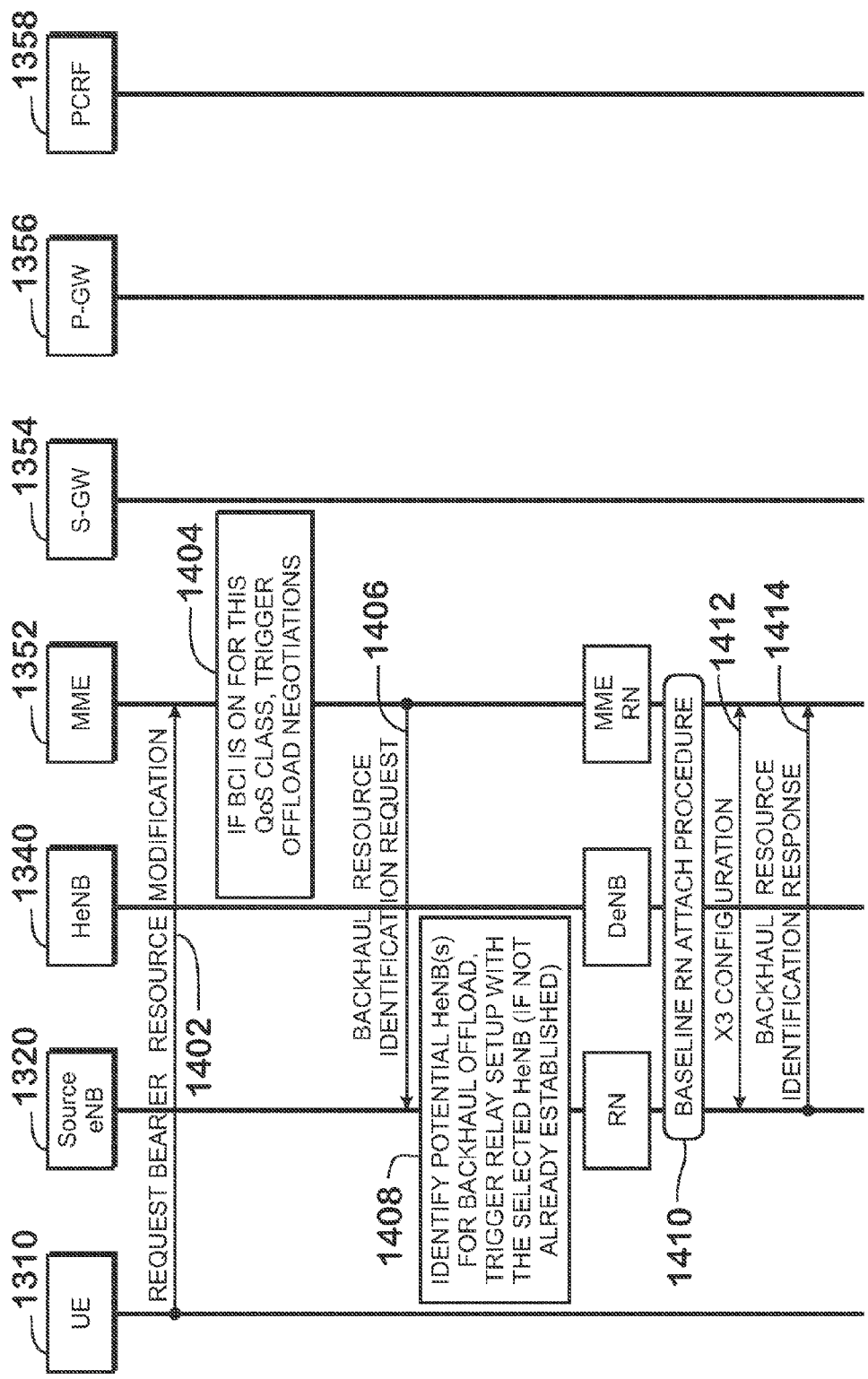
FIGS. 14A and 14B are a signaling diagram of an example process for backhaul offloading via an HeNB in accordance with one embodiment.
Figure 14B:
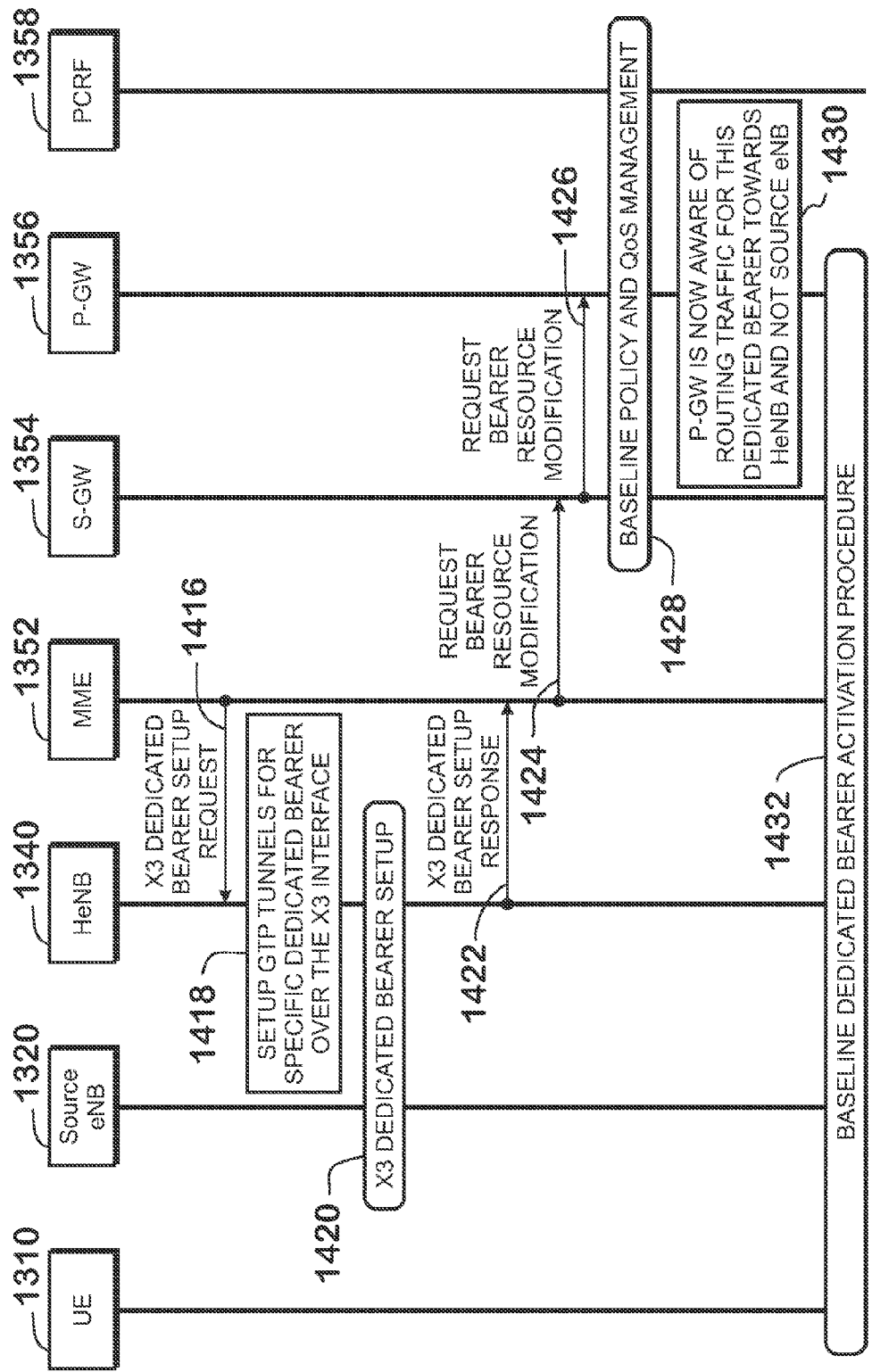

FIGS. 14A and 14B are a signaling diagram of an example process for backhaul offloading via an HeNB in accordance with one embodiment employing the architecture of FIG. 13. The WTRU 1310 sends a bearer request resource modification message to an MME 1352 (1402). If a backhaul congestion indication (BCI) is triggered based on congestion indication in the MME 1352 for a specific quality of service (QoS) class or other traffic or WTRU specific information such as WTRU class, the MME 1352 may trigger backhaul offloading negotiations (1404).

The MME 1352 may send a backhaul resource identification request message to the source eNB 1320 (1406). This request may indicate to the source eNB 1320 that the MME 1352 is looking for alternative backhaul routes. It may also indicate which QoS class the backhaul is required for.

The source eNB 1320 may identify the potential HeNB(s) for traffic offloading (1408). Once a target HeNB(s) is selected, the source eNB 1320 may trigger setup of an X3 interface to the selected HeNB 1340 if it is not already established (1408). The source eNB 1320 may act as an RN and the HeNB 1340 may take the role of a DeNB. The source eNB 1320 (as RN) and the HeNB 1340 (as DeNB) may utilize the RN attach procedures to setup the Un interface (1410). This may trigger setup of an X3 interface using X3 application part (AP) (1412). Once the X3 interface is setup between the source eNB 1320 and the HeNB 1340, the source eNB 1320 may update the MME 1352 that alternative backhaul is configured using a backhaul resource identification response message (1414). This message may indicate to the MME 1352 which HeNB is being used for providing backhaul. The source eNB 1320 may indicate what QoS the HeNB 1340 is able to maintain for this alternative backhaul.

Referring to FIG. 14B, the MME 1352 may trigger setup of dedicated tunnels by sending an X3 dedicated bearer setup request message to the HeNB 1340 that was indicated in the backhaul resource identification response message (1416). The HeNB 1340 may setup GPRS tunneling protocol user plane (GTP-U) tunnel(s) for the dedicated bearer over the X3 interface (1418), and perform X3 dedicated bearer setup with the source eNB 1320 (1420). The HeNB 1340 may respond with an X3 dedicated bearer setup response message to the MME 1352 (1422). At this point the source eNB 1320 and the HeNB 1340 have established the required backhaul for offloading the backhaul from the source eNB 1320 for this particular bearer(s) that is being established.

The MME 1352 may then send a bearer resource modification request to the S-GW 1354 (1424) which then forwards it to the P-GW 1356 (1426). The P-GW 1356 may then perform policy and QoS management with assistance from a policy control rules function (PCRF) 1358 (1428). Once the policy checks are complete, the P-GW 1356 is aware of how to route traffic for the particular bearer(s) of the WTRU 1310 via the HeNB 1340 (1430). A baseline dedicated bearer activation procedure may then be performed (1432). The HeNB 1340 may use the GTP-U tunnels set up over the Un interface to forward the packets to the source eNB 1320. The source eNB 1320 removes the GTP-U/IP headers and then forward the packets to the WTRU 1310 via the Uu interface. The procedure may be reversed for uplink data traversal from the WTRU 1310 to the source eNB 1320 and from the source eNB 1320 to the MCN 1350 via the HeNB 1340.

The source eNB 1320 may keep mappings of which bearer traffic is sent over which backhaul interface. The source eNB 1320 may map different backhaul interfaces for different bearers from the same WTRU 1310. Although the WTRU 1310 is attached to the source eNB 1320, data for certain bearers may be to a different node, (i.e., HeNB 1340 in this example). Even though the WTRU 1310 is not directly connected to the HeNB 1340, the network may route the data to the source eNB 1320.

Selection of traffic for backhaul offload may be determined based on policy. One of the considerations when determining which bearer should or should not be offloaded via the alternative backhaul is the additional delay introduced due to the presence of an additional hop and the fact that the alternate backhaul may traverse the public Internet to get from the HeNB to the core network. Moreover, WTRU mobility (and the resulting bearer modification procedure) may result in additional delays as well as some packet loss. Bearers with QoS that cannot tolerate such degradations may not be offloaded. For example, bearers with QoS class identifier (QCI) classes 4, 5, or 8 may be suited for backhaul offload because of their tolerance for delay and frame error rates.

In order to make efficient backhaul offload decisions, an eNB may be given an indication of congestion on the backhaul. In one embodiment, a backhaul congestion indicator (BCI) may be introduced between the eNB and the MME. It is assumed that a transport network layer (TNL) has informed the MME about any congestion overload on the S1-U interface or within the MCN. The BCI may be sent by the MME to the eNB, when it detects congestion based on information provided or may be queried by the eNB when it performs call admission procedures.

An MME may send a backhaul congestion start message to an eNB to inform the eNB of the backhaul congestion or a need of backhaul offloading so that the eNB may not introduce any new calls or additional bearers that may increase the backhaul traffic. The MME may indicate in the backhaul congestion start message which QoS related bearers are not allowed to be admitted into the backhaul network. This may be signaled indicating the allowed or not allowed QCI or any other traffic parameters that represent the characteristics of traffic flows or prioritization based on different class of WTRUs. The eNB may then reject either RRC connection establishments for non-emergency mobile originated data transfer (e.g., traffic corresponding to RRC cause "mo-data" and "delayTolerantAccess"). The eNB may not allow new bearers to be added for the existing RRC connections, if they relate to certain traffic class or QCI, for example delay tolerant traffic.

The MME may subsequently send a backhaul congestion modify message to the eNB to inform which QoS related bearers are allowed and not allowed to be admitted into the backhaul network. This may be signaled indicating the allowed or not allowed QCI or any other traffic parameters that represent the characteristics of traffic flows or prioritization based on different class of WTRUs. The eNB may then reject RRC connection establishments for non-emergency mobile originated data transfer (e.g., traffic corresponding to RRC cause "mo-data" and "delayTolerantAccess"). The eNB may not allow new bearers to be added for existing RRC connections, if they relate to certain traffic class or QCI, for example delay tolerant traffic.

The MME may send a backhaul congestion stop message to the eNB to clear any filtering or rejection criteria set in the eNB based on the backhaul congestion information provided by the MME. The eNB may then perform call and bearer admission without considering the backhaul congestion status until the eNB receives another backhaul congestion start or backhaul congestion modify messages.

Figure 15:
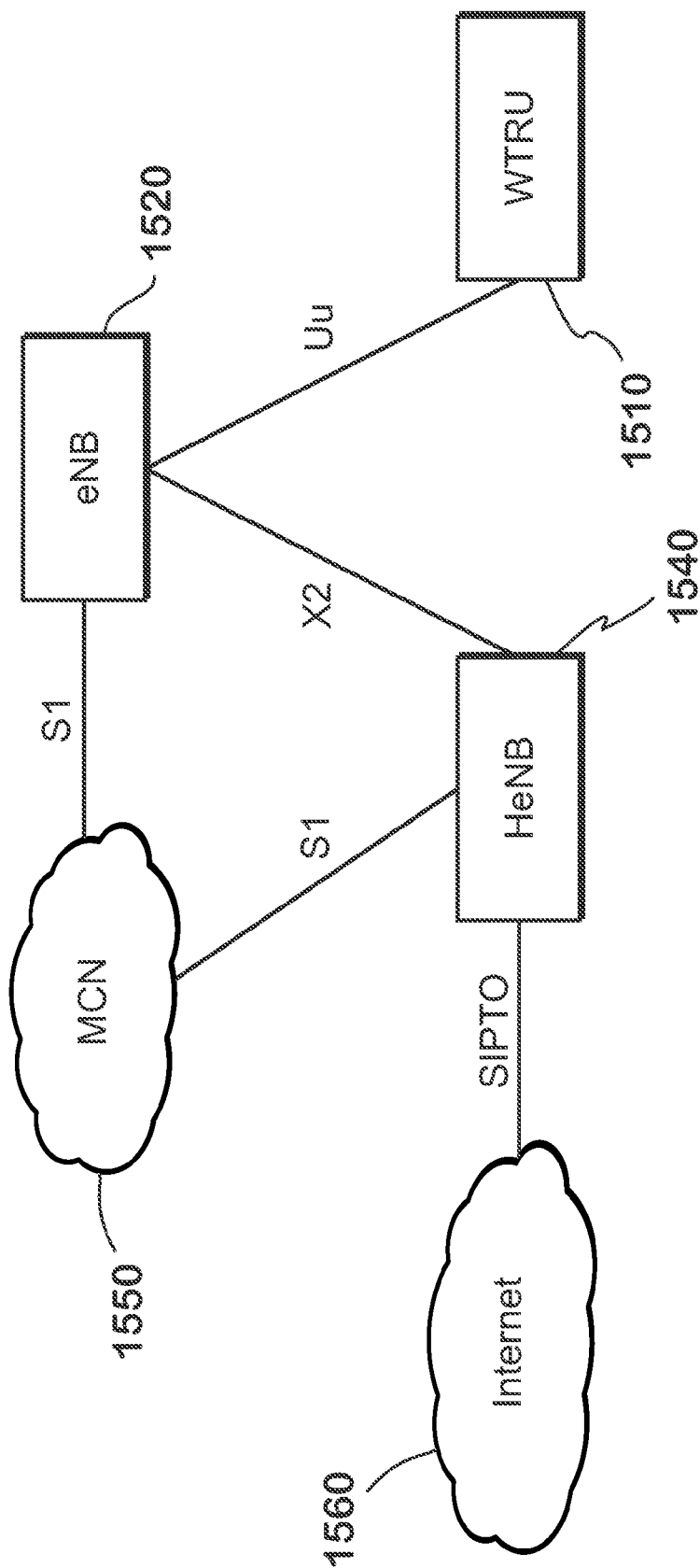
FIG. 15 is an example network architecture for offloading traffic using a direct macro-to-femto link over an X2 interface.

In another embodiment, traffic may be offloaded from a macro-cell to a femto-cell, or vice versa, via an X2 interface between an eNB and an HeNB. FIG. 15 is an example network architecture for offloading traffic using a direct macro-to-femto link over an X2 interface. A WTRU 1510 is connected to an eNB 1520. The eNB 1520 is connected to an MCN 1550 via an S1 interface. An HeNB 1540 is deployed to serve a femto-cell, and is connected to the MCN 1550 and the Internet 1560. A direct link between the HeNB 1540 and the eNB 1520 may be established over the X2 interface. The direct link between the eNB 1520 and the HeNB 1540 may be active at all times.

The eNB 1520 may choose to offload some of its traffic to the HeNB 1540, for example, when its backhaul is over utilized, or served for high priority traffic. Offloading in the opposite direction is also possible. When the eNB 1520 chooses to offload traffic from its backhaul and chooses a target cell to offload it to, the eNB 1520 may connect to the HeNB 1540 through the X2 interface. Either the eNB 1520 or the HeNB 1540 may be a source and the other may be a target for offloading traffic.

For a 3GPP compliant system, an X2 interface may interconnect two eNBs (macro-cell eNBs). The X2 interface supports exchange of signaling information between two eNBs it connects and supports forwarding of protocol data units (PDUs) to the respective tunnel endpoints. The X2 interface may be used when handover occur wherein the source eNB transmits the remnant data packets to the target eNB during handover. In this embodiment, the X2 interface may be provided between an eNB and an HeNB and it may be used for traffic offloading from the eNB to the HeNB, or vice versa. The HeNB 1540 (or the eNB 1520) may forward traffic between the X2 interface and its backhaul.

Figure 16:
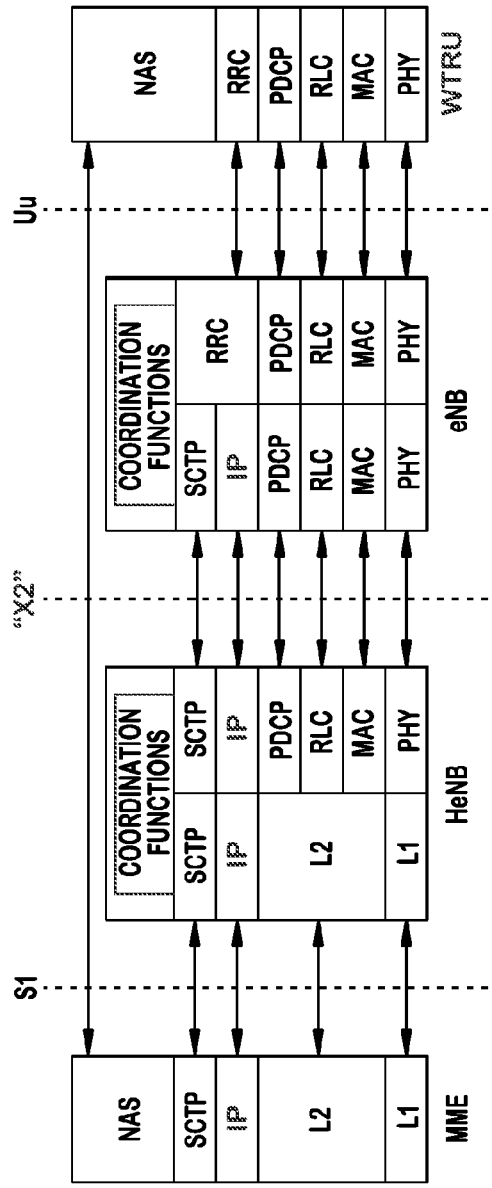
FIGS. 16 and 17 show the control and user plain protocol architectures for offloading traffic using an X2 interface between an eNB and an HeNB.
Figure 17:
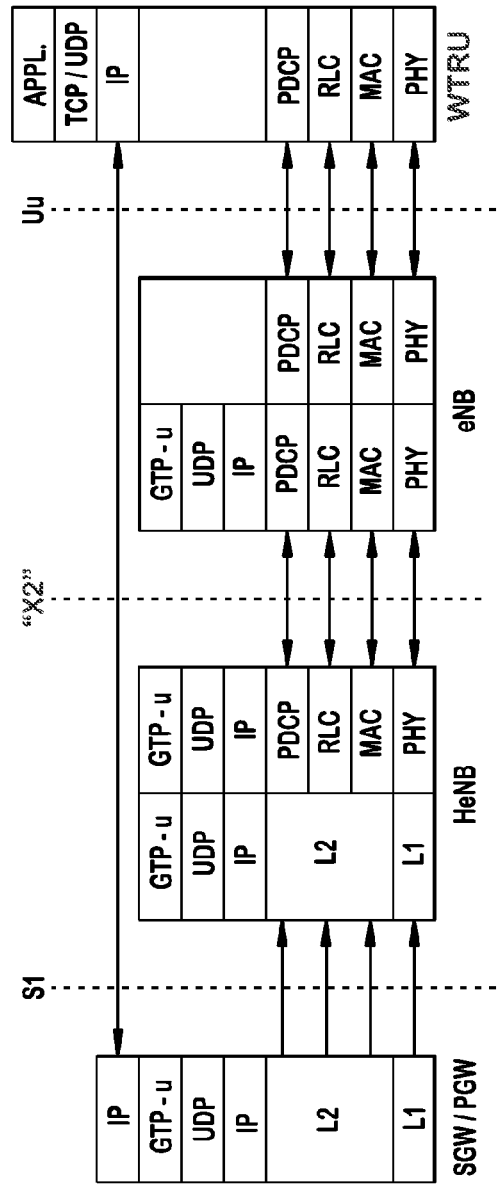

FIGS. 16 and 17 show control and user plain protocol architectures for offloading traffic using an X2 interface between an eNB and an HeNB.

In one embodiment, a Un interface, used by the Relays, may be used to function as a physical layer for the X2 interface. Considering that the relay node is essentially an eNB, the X2 interface may be implemented over such relay architecture.

The following is the list of functions provided by the X2 application part (X2AP). A mobility management function allows the eNB to move the responsibility of a certain WTRU to another eNB. Forwarding of user plane data, status transfer, and WTRU context release function are parts of the mobility management function. A load management function may be used by eNBs to indicate resource status, overload, and traffic load to each other. The reporting of general error situations function allows reporting of general error situations. A resetting the X2 function may be used to reset the X2 interface. A setting up the X2 function may be used to exchange necessary data for the eNB to setup the X2 interface and implicitly perform an X2 reset. An eNB configuration update function allows updating of application level data needed for two eNBs to interoperate correctly over the X2 interface. A mobility parameters management function allows the eNB to coordinate adaptation of mobility parameter settings with a peer eNB. A mobility robustness optimization function allows reporting of information related to mobility failure events. An energy saving function allows decreasing energy consumption by enabling indication of cell activation/deactivation over the X2 interface.

In order to use the X2 interface for offloading backhaul traffic, some of the existing functions in X2AP may be reused with modification.

The setting up the X2 function includes a procedure called "X2 setup," whose purpose is to exchange application level configuration data needed for two eNBs to interoperate correctly over the X2 interface. The X2 setup procedure erases any existing configuration data in the two eNBs and replaces it with the one received. The procedure also resets the interface itself. Part of the information exchanged during this procedure, (such as list of served cells, neighbor information, the number of antenna ports, etc.), may be used by the eNB to maintain its candidate offloading femto-cell database. The eNB may use this database to choose femto-cells for offloading each traffic stream.

The resetting the X2 function includes a procedure called "reset," whose purpose is to re-align the resources between two eNBs (home or macro) and to reset the X2 interface. This procedure does not change the existing application level configuration data (already exchanged during the X2 setup procedure). Similar to the X2 setup procedure, the reset procedure may be used for exchange of information that can be used for backhaul offloading efficiently.

Resource status reporting is one of the procedures under the load management function. An eNB reports measurements requested by other eNBs in the resource status reporting initiation procedure. Some of the measurements reported, (such as the radio resource status, the S1 TNL load indicator, composite available capacity group, etc.) may be used by the eNB to choose femto-cells to offload traffic to.

The procedure used to establish necessary resources in an eNB for an incoming handover is called a handover preparation procedure which is part of the mobility management function. During the handover preparation procedure, an E-Radio Access Bearer (E-RAB) is setup for forwarding of data. This procedure, separated from the mobility management function, may be used by the eNB to offload traffic to an HeNB.

The X2 interface may be implemented sharing its physical layer with the Uu (as well as Un for LTE relay) interface. In other words, the X2 interface may be implemented over the licensed cellular spectrum. The eNB and the HeNB are already capable of using these frequencies.

Alternatively, the X2 interface may be implemented over the unlicensed WiFi spectrum. A direct interface between an eNB and an HeNB may be a physical link using a different RAT, for example, a WiFi link. WiFi over a new spectrum (such as TV white space (TVWS)) may be used. This may be achieved by adding a WiFi or similar interface to both the eNB and the HeNB, and deploying WiFi (or similar) repeaters in the region. In this way, a multihop link between the eNB and any of the HeNBs in the region may be established.

Alternatively, the X2 interface may be built on a wired IP network independent of the existing cellular network. For this, either existing infrastructure (e.g., from internet service providers (ISPs)) may be reused, or new infrastructure may be installed.

Figure 18:
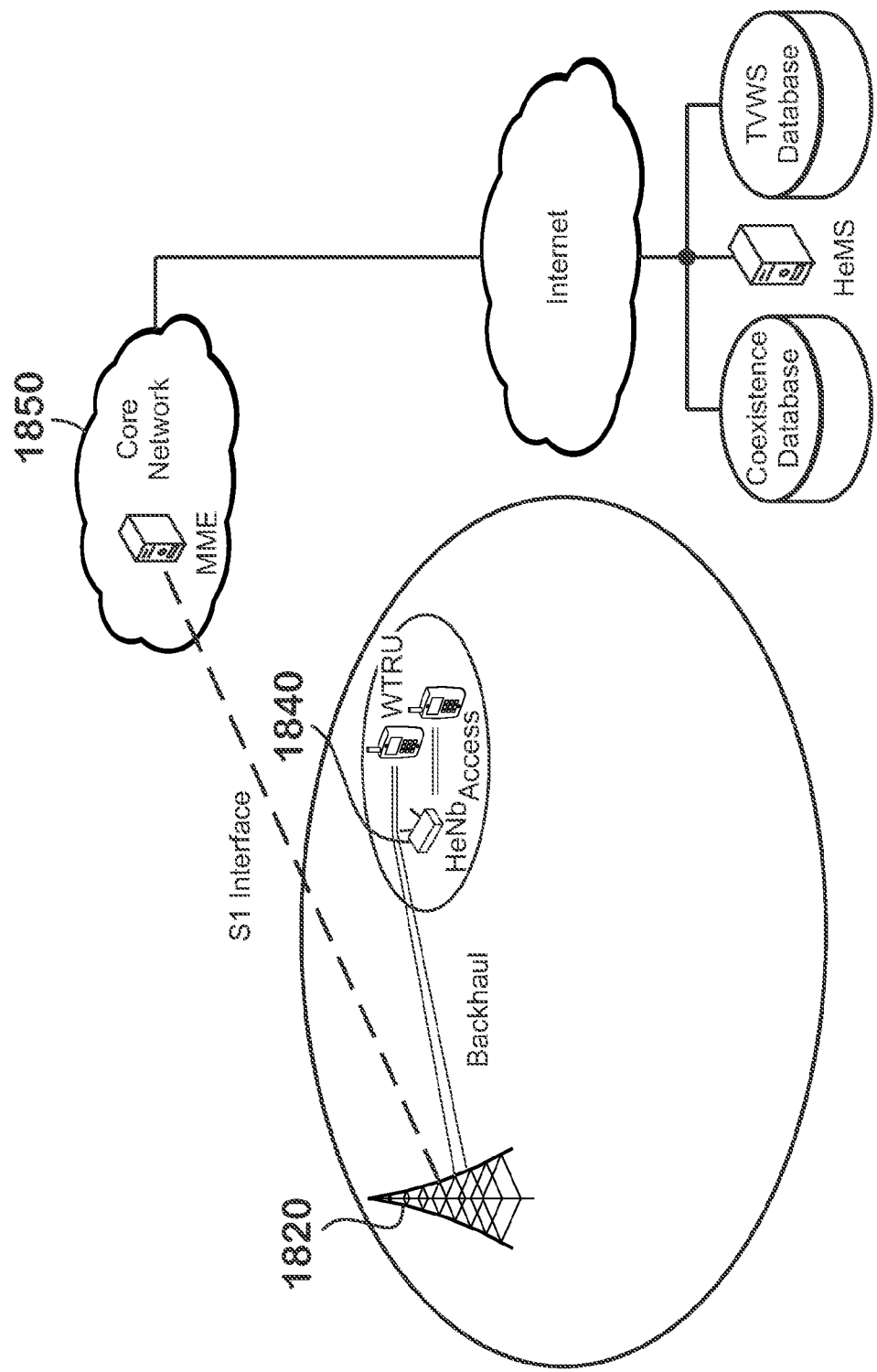
FIG. 18 shows an example network architecture wherein backhaul from a small cell is established through a macro-cell.

Embodiments for establishing a backhaul link from a small cell to a macro-cell will be explained hereafter. FIG. 18 shows an example network architecture wherein backhaul from a small cell is established through a macro-cell. An HeNB 1840 establishes a wireless backhaul (or self backhaul) interface between itself and an eNB 1820. If the HeNB 1840 supports both WTRU and eNB functionalities, the HeNB 1840 may use the WTRU functionality to establish a wireless link over the licensed spectrum to the eNB 1820.

Figure 19:
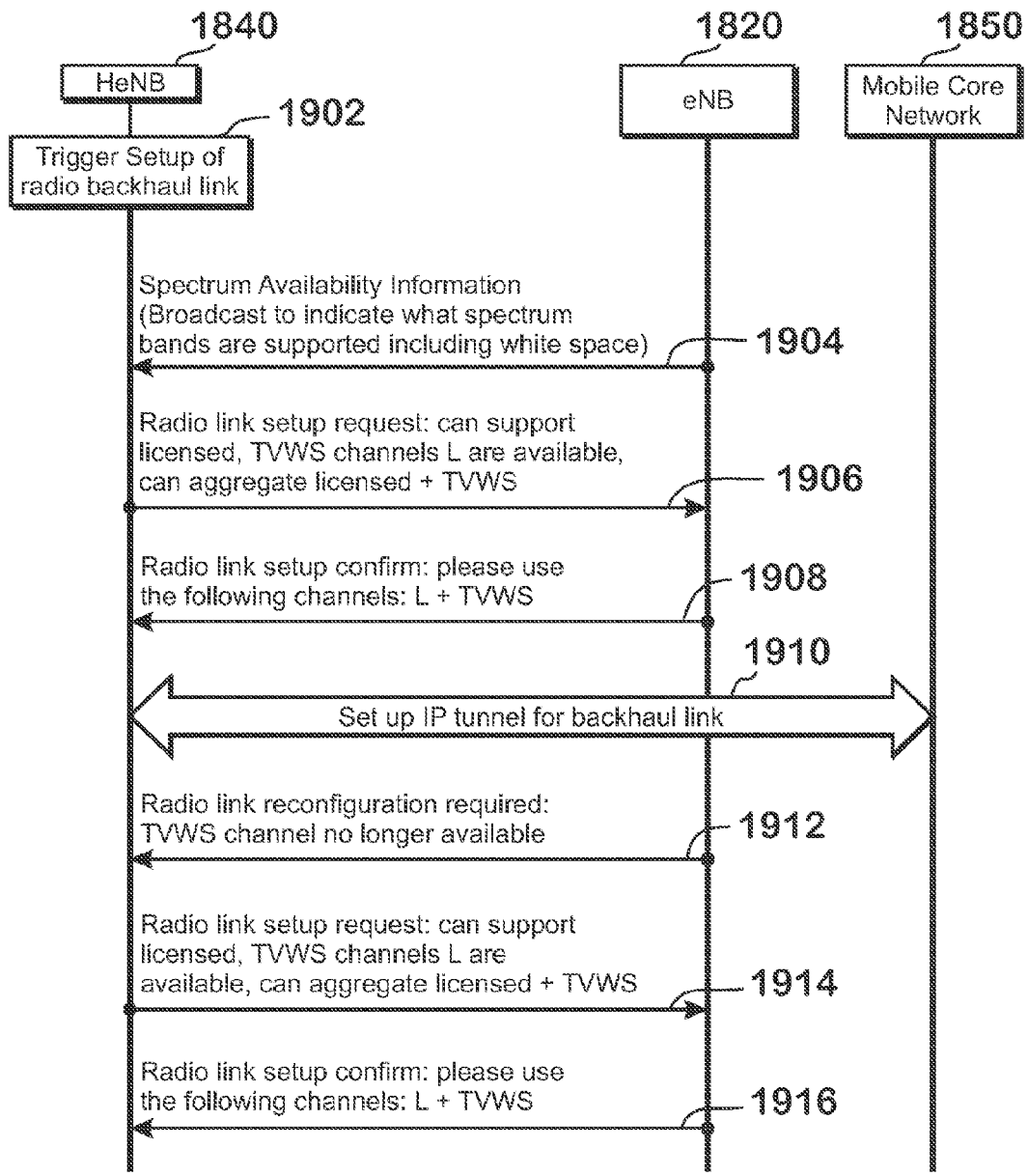
FIG. 19 is a signaling diagram of an example process of backhaul offloading from a small cell to a macro-cell.

FIG. 19 is a signaling diagram of an example process of backhaul offloading from a small cell to a macro-cell for the FIG. 18 architecture. The HeNB 1840 may trigger setup of a radio backhaul link to the eNB 1820 (1902). The eNB 1820 may broadcast spectrum availability information to indicate what spectrum bands are supported (e.g., including TVWS) (1904).

A negotiation between the HeNB 1840 and the eNB 1820 may occur prior to the establishment of the wireless link between them. During the negotiation phase, capability information may be exchanged to determine the frequency spectrum to use. The eNB 1820 may set up a wireless link using the negotiated spectrum to the HeNB 1840. Alternatively, the HeNB 1840 may request a particular spectrum if it is available. Alternatively, the eNB 1820 may allocate or aggregate multiple spectrum for use by the HeNB 1840. In case where a TVWS channel is allocated, the government regulations need to be adhered to. Both the eNB 1820 and the HeNB 1840 may have an access to a geo-location database to confirm that the TVWS channels are available (i.e., not used by a primary user).

The HeNB 1840 may transmit a radio link setup request to the eNB 1820 to set up a radio backhaul link (1906). The radio link setup request may indicate the support of licensed spectrum, available TVWS channels, support of aggregation of licensed spectrum and TVWS, or the like. The request from the HeNB 1840 to the eNB 1820 may use normal LTE signaling to establish a wireless link. The wireless link is used as a backhaul for any devices that the HeNB 1840 serves. If both the eNB 1820 and the HeNB 1840 support additional spectrum or resources such as time division duplex (TDD) or TVWS, the link may be established over the alternative medium.

The eNB 1820 sends a radio link setup response message to the HeNB 1840 (1908). The radio link setup response message may indicate to use specific channel for the radio backhaul link.

The HeNB 1840 may then set up an IP tunnel with the MCN 1850 for the backhaul link (1910). If the radio backhaul link was established on a TVWS channel and if the TVWS channel becomes unavailable, for example, due to regulations or due to severe interference, a reconfiguration request may be sent from either the eNB 1820 or the HeNB 1840. In this example, if the TVWS channel is no longer available, the eNB 1820 may send a radio link reconfiguration message to the HeNB 1840 (1912). The HeNB 1840 may send a radio link setup request message (1914). The radio link setup request may indicate the support of licensed spectrum, available TVWS channels, support of aggregation of licensed spectrum and TVWS, or the like. The eNB 1820 sends a radio link setup response message to the HeNB 1840 indicating a specific channel for the radio backhaul link. (1916).

Figure 20:
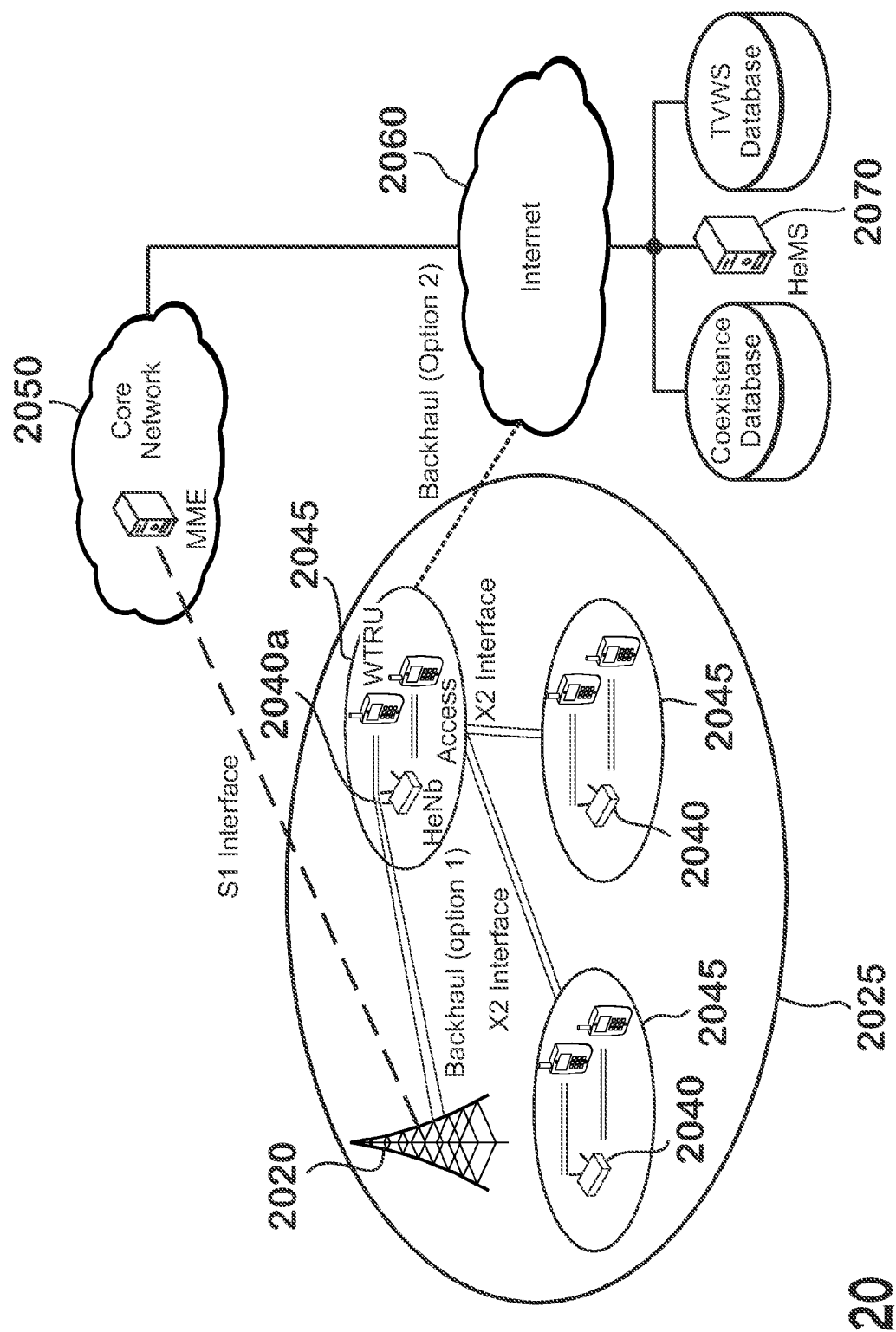
FIG. 20 shows an example network architecture where a wireless backhaul is established by a network of small cell base stations via an X2 interface.

In another embodiment, small cell eNBs (e.g., HeNBs) may form a network using the X2 interface for backhaul purposes. FIG. 20 shows an example network architecture where a wireless backhaul is established by a network of small cell base stations via an X2 interface. In FIG. 20, a plurality of femto-cells 2045 are deployed in a coverage area of a macro-cell 2025. Each femto-cell 2045 is served by a corresponding HeNB 2040, 2040*a*. The HeNBs 2040, 2040*a* may form a network using the X2 interface for backhaul purposes.

The HeNBs 2040, 2040*a* may discover neighbor HeNBs using any conventional methods. If the HeNBs 2040, 2040*a* support a WTRU functionality, the HeNBs 2040, 2040*a* may camp on and listen to the broadcast channel sent from the neighbor HeNBs to discover the spectrum capabilities. Alternatively or in combination, the spectrum information may be pre-configured in the HeNBs 2040, 2040*a*, retrieved from a core network 2050, or retrieved from an HeNB management system (HeMS) 2070. The core network 2050 or the HeMS 2070 stores the location, and capability for each HeNB (e.g., whether an HeNB supports a gateway capability, supports operation in TVWS (a list of channels it supports) and over what channel to use for the X2 interface, access to a geo-location database, sensing capabilities, etc.). The HeNB 2040, 2040*a* may request the information from the core network 2050 or the HeMS 2070 about the HeNB neighbors and their capabilities. If an HeNB 2040 does not have a gateway function then it searches through the list of available HeNB neighbors for one that has a gateway function, and may set up a point-to-point interface between itself and the HeNB 2040*a* having a gateway function (an HeNB gateway).

The HeNB 2040 may compare its own spectrum availability and capabilities with those of the candidate HeNB gateway 2040*a* (e.g., either preconfigured, retrieved from the HeMS 2070, or obtained by camping on the cell). If both the HeNB 2040 and the HeNB gateway 2040*a* support TVWS, and through the geo-location database both determine that they have a common channel that they are permitted to operate on, the HeNB 2040 may send an X2 radio link setup request for backhaul purposes to the HeNB gateway 2040*a*, for example, over the licensed spectrum (i.e., acting as a WTRU). The HeNB 2040 may indicate in the request a list of channels and spectrum that it can support. The HeNB gateway 2040*a* verifies its own capacity and, if there is sufficient capacity, sets up a physical channel for the HeNB 2040 to use as a backhaul. An IP tunnel is set up from the HeNB 2040 to the macro core network through the HeNB gateway 2040*a*. Normal signaling and data stream protocols may be used to tunnel the data over the X2 interface through the HeNB gateway 2040*a*.

The physical medium for the X2 link may be selected dynamically between the two end points and depends on the capabilities of each. The HeNB 2040 and the HeNB gateway 2040*a* may negotiate the physical medium, such as based on who has the most restrictive set. For example, if both the HeNB 2040 and the HeNB gateway 2040*a* support operation in TVWS, they may check that at least one channel in TVWS is available for operation for both. This check may be made through requests to a geo-location database which stores information about availability of spectrum for certain locations, and/or through sensing the medium to detect the presence of a primary user.

Interference may be taken into account in selecting a channel. Negotiation over which RAT to use may also be performed (i.e., WiFi, LTE, WiMax, etc.). If the spectrum in question has a lot of secondary users, or the interference cannot be overcome through power control, the carrier sense multiple access (CSMA)-based RAT (e.g., WiFi RAT), rather than the scheduler-based RAT (e.g., LTE) may be selected. When the usage of the channel is minimal by the secondary users or the interference is such that in can be overcome through power control, the scheduler-based RAT may be selected. This is one example; other criteria may be employed. Alternatively, a combination of licensed and TVWS channels may be used and the channel may be dynamically switched. Beamforming may be used to enable reuse of other channels. The maintenance of the physical medium may be performed continuously and updated with new RAT, new channel, etc.

In the system set forth in FIG. 20, the backhaul may be either through the eNB 2020 or through a wired interface such as DSL to the Internet 2060. In case where the backhaul is through the eNB 2020, the HeNB gateway 2040*a* may have a WTRU function that can access the macro network through the normal macro network access channels. This backhaul link may be set up through normal WTRU access channels. The backhaul link may be a combination of licensed macro network spectrum (such as LTE) or TVWS spectrum in uplink and/or downlink directions. The use of TVWS for the backhaul link may be subject to FCC rules, and its use may be limited to the availability of the channels in the geo-location database for the given locations. The continued use of the TVWS channel may be dependent on interference conditions. Maintenance of the link may be performed and the use of the TVWS channels may be dynamically added and removed from the backhaul link based on interference and congestion conditions. If one or more TVWS channels are available (with little interference) most of the backhaul traffic may be carried over the TVWS channel. In case where the interference is high, most of the traffic may be carried over the licensed macro network spectrum. The licensed and TVWS channels may be aggregated for the backhaul link.

Figure 21:
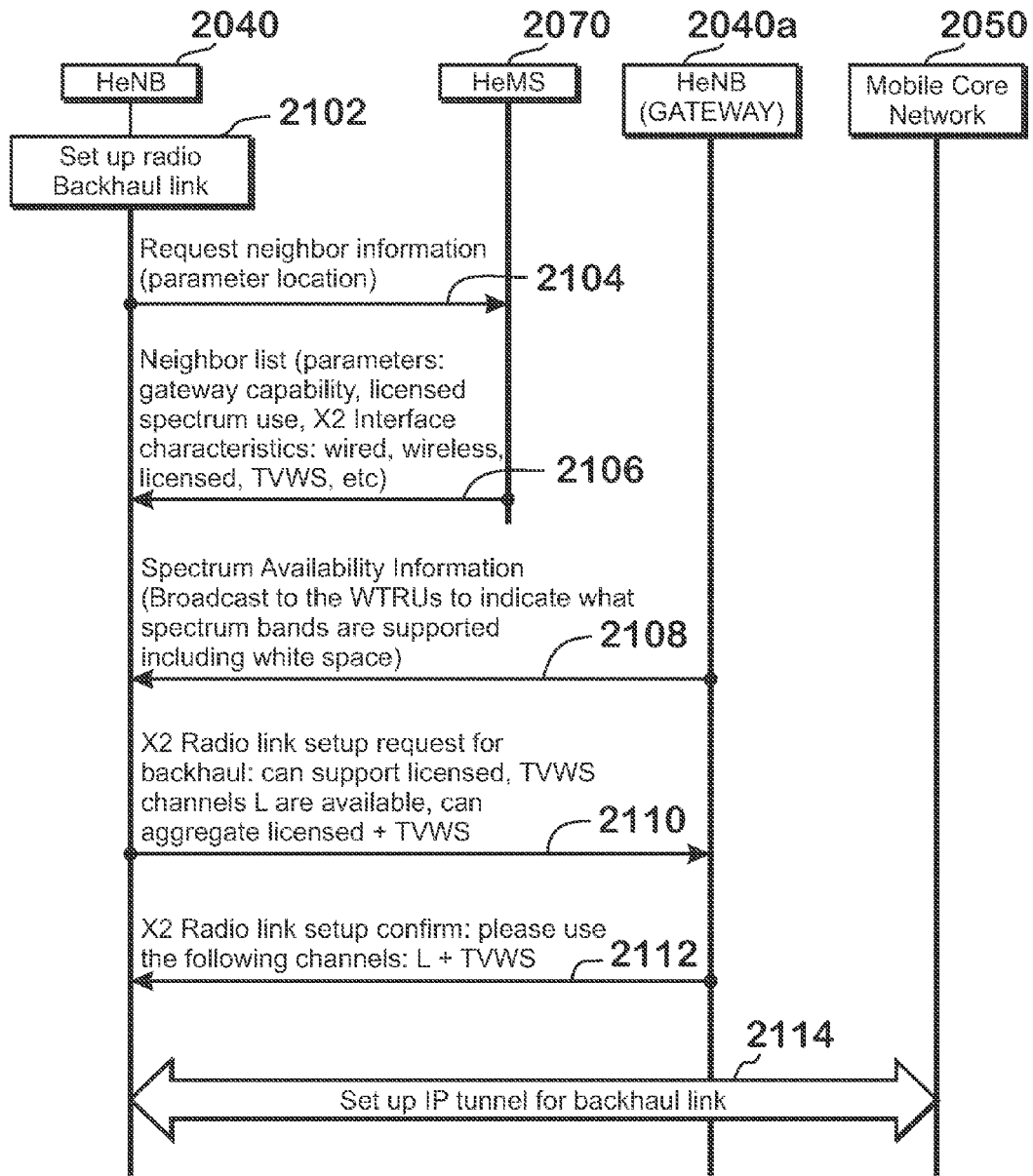
FIG. 21 is a signaling diagram of an example process of setting up a backhaul network via an HeNB gateway.

FIG. 21 is a signaling diagram of an example process of setting up a backhaul network via an HeNB gateway for the FIG. 20 architecture. An HeNB 2040 triggers a setup of a radio backhaul link via the HeNB gateway 2040*a* (2102). The HeNB 2040 may request neighbor information from the HeMS 2070 (2104). The request may include location information of the HeNB 2040. The HeMS 2070 may provide to the HeNB 2040 a neighbor list including parameters, such as gateway capability, licensed spectrum use, X2 interface characteristics (wired, wireless, licensed, TVWS, etc.) (2106).

The HeNB gateway 2040*a* may broadcast spectrum availability information (broadcast to the WTRUs to indicate what spectrum bands are supported including TVWS) (2108). The HeNB 2040 may send an X2 radio link setup request for backhaul to the HeNB gateway 2040*a* (2110). The HeNB 2040 may indicate in the request its support of licensed channel(s), TVWS channels available, and aggregation of licensed and TVWS channels, etc. The HeNB gateway 2040a may send an X2 radio link setup response message to the HeNB 2040 including the channel(s) to be used for backhaul (2112). The backhaul link is then setup and IP tunnel for the backhaul link is setup with the mobile core network 2050 (2114).

Traffic offloading may increase a degree of unreliability to the connection. In addition, mobility of users needs handoff procedures at multiple points. In one embodiment, the mobile network operator may choose to separate out traffic that may not be offloaded. For example, voice and other real-time traffic (mobile TV, video calls, etc.) may be categorized as traffic that may not be offloaded. For such traffic, the eNB may use its own backhaul. All other data traffic which is not as delay sensitive and does not require as much reliability may be offloaded.

Once the eNB makes a decision to offload a particular traffic stream, the eNB may choose a femto-cell to offload the traffic to. The femto-cell selection may need to achieve highest efficiency, while maintaining fairness.

The choice of the femto-cell may be based on several criteria. The eNB may maintain a list of femto-cells to which traffic can be offloaded at any given time. Not all femto-cells within the eNB coverage may be used for offloading.

The eNB may consider the existing load on the femto-cell (that may include load from existing offloading traffic streams as well as traffic from WTRUs associated with the femto-cell). For example, a femto-cell with higher load may be given a lower priority for offloading to ensure fairness as well as efficiency.

The eNB may consider whether the link between the eNB and the HeNB is direct or indirect, whether it uses cellular spectrum or WiFi spectrum, and/or the capacity of the link. A link with higher capacity may be given a higher priority. The capacity of the backhaul link may be stable or variable. Therefore, the capacity information may be updated periodically and the rate of updating this data at the eNB may be chosen accordingly. The capacity of the macro-femto link may also be a factor in the location of the HeNB with respect to the eNB.

The eNB may consider the type of traffic being offloaded in selecting a femto-cell to offload traffic to. For example, delay tolerant traffic may be offloaded to a lower capacity femto-cell while reserving better quality links for traffic that needs better QoS.

A fairness index parameter, (e.g., the ratio of the macro-femto link capacity to the load on the femto-cell), may be used by the eNB in considering the above factors in selecting the femto-cell. A higher fairness index gives a femto-cell priority to offload traffic to.

Embodiments for a process where a user of a WTRU including relay WTRU moves in and out of a femto-cell are disclosed hereafter. Hereafter, the WTRU that generates the demand under consideration is referred as "served WTRU." The traffic being offloaded is intended for the served WTRU.

A served WTRU may move into a femto-cell range (referred to as target femto-cell) while the served WTRU is receiving (or transmitting) traffic from (or to) the macro-cell and the macro-cell is using a femto-cell (referred to as source femto-cell) to offload the traffic for the served WTRU. The target femto-cell and the source femto-cell may or may not be the same. The served WTRU gets associated with the target femto-cell, and may be able to continue receiving traffic via the target femto-cell instead of the eNB.

If the WTRU moves into the target femto-cell that the macro-cell is using to offload its traffic from the WTRU to, (i.e., the target femto-cell and the source femto-cell are the same), the source femto-cell may continue to fetch traffic from its backhaul, and start to serve the newly associated WTRU directly.

If the target femto-cell is not the same as the source femto-cell, a handover may be performed to maintain seamless service to the served WTRU. This handoff involves switching the backhaul serving the traffic from the source femto-cell backhaul to the target femto-cell backhaul and passing on all the traffic queued up at the original HeNB, the relay WTRU if used, and the eNB. This handover is not very different from a combination of the normal active state handover that takes place from the macro eNB to an HeNB and that from one HeNB to another HeNB.

A served WTRU, associated with and being directly served by a femto-cell (referred to as source femto-cell), may move out of the range of the source femto-cell and subsequently associates with a macro-cell or a new femto-cell. If the served WTRU subsequently associates with a new femto-cell and not with a macro-cell, or if the served WTRU subsequently associates with a macro-cell and the macro-cell uses its own backhaul for the service (i.e., not using backhaul offloading onto another femto-cell), it is a conventional handover from a femto-cell to a macro-cell or handover from one femto-cell to another.

If the served WTRU subsequently associates with a macro-cell and the macro-cell chooses to offload this traffic to a femto-cell in the region (referred to as target femto-cell), embodiments below may be implemented. The served WTRU may be able to continue its traffic reception or transmission from/to the macro-cell.

If the macro-cell chooses to offload the traffic for the served WTRU to the same femto-cell that the WTRU was previously associated with, (i.e., the source femto-cell and the target femto-cell are the same), the source femto-cell may continue to fetch traffic from its backhaul, and start relaying the traffic to the macro-cell eNB instead of the WTRU itself.

If the target femto-cell that the macro-cell chooses to offload the traffic is not the one the served WTRU was just associated with (i.e., the source femto-cell and the target femto-cell are different), a handover is necessary. This handoff may be viewed as a combination of femto-cell to macro-cell handoff and a macro-cell to femto-cell handoff.

The eNB may choose to use the source femto-cell as the target femto-cell as a default rule. In this way, implementation may be made easier.

When a relay WTRU is used to relay traffic between the eNB and the (offloading) HeNB, the relay WTRU may move out of the HeNB's coverage. The macro-cell may be able to continue to serve the served WTRU when the relay WTRU involved in the offloading moves out of its femto-cell range (referred to as source femto-cell). In one embodiment, the macro-cell may start using its own backhaul for the traffic. This will involve a femto-to-macro handoff while the change remains transparent to the served WTRU.

Alternatively, the macro eNB may choose to find another relay WTRU and offload traffic to a femto-cell that may or may not be the same as the source femto-cell. If the macro eNB can find a new potential relay WTRU that is associated with the same femto-cell as the relay WTRU previously used for the same service was associated with, the macro eNB may choose to use this as the new relay WTRU. In this case, the source femto-cell may continue to fetch offload traffic from its backhaul as before while changing the relay WTRU in use.

If the new relay WTRU that the macro eNB finds is associated with a new femto-cell (referred to as target femto-cell), a handoff is necessary. This handoff is similar to a normal femto-to-femto handoff.

If the relay WTRU moves out of the source femto-cell and moves into a target femto-cell and the macro eNB may choose to continue to use the same relay WTRU for offloading.

Embodiments

1. A method for offloading backhaul traffic.

2. The method of embodiment 1 comprising a first base station detecting a condition that triggers backhaul traffic offloading for a WTRU that is associated with the first base station.

3. The method as in any one of embodiments 1-2, comprising the first base station establishing a wireless connection with a second base station.

4. The method of embodiment 3 comprising the first base station offloading at least one bearer of the WTRU that is initially transferred via the first base station onto the second base station via the wireless connection, such that the offloaded bearer is routed to and from the WTRU via the second base station and the first base station.

5. The method as in any one of embodiments 3-4, wherein the first base station is a macro-cell base station and the second base station is a femto-cell base station having a wired connection to Internet and a mobile operator core network, and the at least one bearer is offloaded via the wired connection of the femto-cell base station.

6. The method as in any one of embodiments 3-5, wherein the first base station includes a relay functionality and acts as a relay between the WTRU and the second base station.

7. The method as in any one of embodiments 3-6, wherein the first base station communicates with the WTRU via a Uu interface and communicates with the second base station via a Un interface, and the at least one bearer is offloaded via the Un interface.

8. The method as in any one of embodiments 3-7, wherein the first base station communicates with the WTRU via a Uu interface and communicates with the second base station via a X2 interface, and the at least one bearer is offloaded via the X2 interface.

9. The method as in any one of embodiments 3-8, wherein the wireless connection between the first base station and the second base station is setup over one or a combination of a licensed frequency, a license-exempt frequency, a TV white space frequency, or a wired interface.

10. The method of embodiment 9 wherein the first base station and/or the second base station monitors the wireless connection and adds, switches, or removes a frequency based on at least one of interference, capacity, demand, or policy.

11. The method as in any one of embodiments 2-10, wherein the first base station detects the condition for triggering backhaul traffic offloading based on a backhaul congestion indication received from a mobile operator core network.

12. The method as in any one of embodiments 3-11, wherein the first base station maintains mapping of which bearer is sent over which backhaul interface and a portion of bearers of the WTRU are offloaded onto the second base station.

13. The method as in any one of embodiments 3-12, wherein the first base station is a femto-cell base station having a wired connection to Internet and a mobile operator core network and the second base station is a macro-cell base station.

14. The method as in any one of embodiments 3-12, wherein both the first base station and the second base station are a femto-cell base station and the at least one bearer is offloaded via a network established among a plurality of femto-cell base stations and a gateway femto-cell base station.

15. A base station for offloading backhaul traffic of a mobile network.

16. The base station of embodiment 15 comprising a processor configured to detect a condition that triggers backhaul traffic offloading for a WTRU that is associated with the base station.

17. The base station of embodiment 16, wherein the processor is configured to establish a wireless connection with another base station.

18. The base station as in any one of embodiments 16-17, wherein the processor is configured to offload at least one bearer of the WTRU that is initially transferred via the base station onto the another base station via the wireless connection, such that the offloaded bearer is routed to and from the WTRU via the another base station and the base station.

19. The base station as in any one of embodiments 16-18, wherein the base station is a macro-cell base station and the another base station is a femto-cell base station having a wired connection to Internet and a mobile operator core network, and the at least one bearer is offloaded via the wired connection of the femto-cell base station.

20. The base station as in any one of embodiments 16-19, further comprising a relay functionality configured to act as a relay between the WTRU and the another base station.

21. The base station as in any one of embodiments 16-20, wherein the processor is configured to communicate with the WTRU via a Uu interface and communicate with the another base station via a Un interface, and the at least one bearer is offloaded via the Un interface.

22. The base station as in any one of embodiments 16-21, wherein the processor is configured to communicate with the WTRU via a Uu interface and communicate with the another base station via a X2 interface, and the at least one bearer is offloaded via the X2 interface.

23. The base station as in any one of embodiments 16-22, wherein the wireless connection between the base station and the another base station is setup over one or a combination of a licensed frequency, a license-exempt frequency, a TV white space frequency, or a wired interface.

24. The base station of embodiment 23 wherein the processor is configured to monitor the wireless connection and add, switch, or remove a frequency based on at least one of interference, capacity, demand, or policy.

25. The base station as in any one of embodiments 16-24, wherein the processor is configured to detect the condition for triggering backhaul traffic offloading based on a backhaul congestion indication received from a mobile operator core network.

26. The base station as in any one of embodiments 16-25, wherein the processor is configured to maintain mapping of which bearer is sent over which backhaul interface and a portion of bearers of the WTRU are offloaded onto the another base station.

27. The base station as in any one of embodiments 16-26, wherein the base station is a femto-cell base station having a wired connection to Internet and a mobile operator core network and the another base station is a macro-cell base station.

28. The base station as in any one of embodiments 16-26, both the base station and the another base station are a femto-cell base station and the at least one bearer is offloaded via a network established among a plurality of femto-cell base stations and a gateway femto-cell base station.

29. A method for offloading backhaul traffic comprising:
a base station detecting a condition that triggers backhaul traffic offloading for a wireless transmit/receive unit (WTRU) that is associated with the base station;
the base station establishing a wireless connection with a relay station; and
the base station offloading at least one bearer of the WTRU that is initially transferred via the base station onto the relay station via the wireless connection, such that the offloaded bearer is routed to and from the WTRU via the relay station and the base station.

30. The method of embodiment 29 wherein the base station is a macro-cell base station and the relay station is a femto-cell base station having a wired connection to Internet and a mobile operator core network, and the at least one bearer is offloaded via the wired connection of the femto-cell base station.

31. The method of embodiment 29 wherein the relay station is another WTRU that is in communication with a second base station.

32. The method of embodiment 29 wherein the base station communicates with the WTRU and the other WTRU via a Uu interface and with the other WTRU communicates the second base station via a Uu interface.

33. A base station adapted to facilitate offloading backhaul traffic for a wireless transmit/receive unit (WTRU) comprising:
a transceiver adapted to establish wireless connections with the WTRU and a relay station;
a processor adapted to detect a condition that triggers backhaul traffic offloading for the WTRU while the WTRU wireless communication connection is established; and
the processor adapted to offloading at least one bearer of the WTRU that is initially transferred via the base station onto the relay station via a wireless connection with the relay station, such that the offloaded bearer is routed to and from the WTRU via the relay station and the base station.

34. The base station of embodiment 33 wherein the base station is a macro-cell base station or is a femto-cell base station.

35. The base station of embodiment 33 or 34 wherein the transceiver is adapted to establish a wireless connection with another WTRU that is in communication with a second base station as the relay station.

36. The base station of embodiment 35 wherein the transceiver is adapted to establish wireless connections with the WTRU and the other WTRU via Uu interfaces.

37. A method for offloading backhaul traffic comprising:
a relay station establishing a wireless connection with a base station that has detected a condition that triggers backhaul traffic offloading for a served wireless transmit/receive unit (WTRU) that is associated with the base station; and
the relay station receiving the offload of at least one bearer of the served WTRU that is initially transferred via the base station via the wireless connection, such that the offloaded bearer is routed to and from the served WTRU via the relay station and the base station.

38. The method of embodiment 37 wherein the relay station is a WTRU that is in communication with a second base station such that the offloaded bearer is routed to and from the served WTRU via the second base station, the WTRU and the base station.

39. The method of embodiment 38 wherein the WTRU communicates with the base station and the second base station via a Uu interface.

40. A WTRU adapted to perform the method of embodiment 37, 38, or 39.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for offloading backhaul traffic, the method comprising:
detecting, by a first base station, a condition that triggers backhaul traffic offloading for a wireless transmit/receive unit (WTRU) that is associated with the first base station;
establishing a wireless connection between the first base station and a second base station; and
offloading, by the first base station, at least one bearer of the WTRU that is transferred via the first base station onto the second base station via the wireless connection, such that the offloaded bearer is routed to and from the WTRU via the second base station and the first base station, one of the first base station and the second base station comprising a relay node, the offloaded bearer being tunneled between the first base station and the second base station.

2. The method of claim 1 wherein the first base station is a macro-cell base station and the second base station is a femto-cell base station having a wired connection to the Internet and a mobile operator core network, and the at least one bearer is offloaded via the wired connection of the femto-cell base station.

3. The method of claim 2 wherein the first base station communicates with the WTRU via a Uu interface and communicates with the second base station via a Un interface, and the at least one bearer is offloaded via the Un interface.

4. The method of claim 2 wherein the first base station communicates with the WTRU via a Uu interface and communicates with the second base station via an X2 interface, and the at least one bearer is offloaded via the X2 interface.

5. The method of claim 1 wherein the wireless connection between the first base station and the second base station is setup over one or a combination of a licensed frequency, a license-exempt frequency, a TV white space frequency, or a wired interface.

6. The method of claim 5 wherein at least one of the first base station or the second base station monitors the wireless connection and adds, switches, or removes a frequency based on at least one of interference, capacity, demand, or policy.

7. The method of claim 1 wherein the first base station detects the condition for triggering backhaul traffic offloading based on a backhaul congestion indication received from a mobile operator core network.

8. The method of claim 1 wherein the first base station maintains mapping of which bearer is sent over which backhaul interface and a portion of bearers of the WTRU are offloaded onto the second base station.

9. The method of claim 1 wherein the first base station is a femto-cell base station having a wired connection to the Internet and a mobile operator core network and the second base station is a macro-cell base station.

10. The method of claim 1 wherein both the first base station and the second base station are a femto-cell base station and the at least one bearer is offloaded via a network established among a plurality of femto-cell base stations and a gateway femto-cell base station.

11. A base station for offloading backhaul traffic, the base station comprising:
a processor configured to detect a condition that triggers backhaul traffic offloading for a wireless transmit/receive unit (WTRU) that is associated with the base station, establish a wireless connection with another base station, and offload at least one bearer of the WTRU that is transferred via the base station onto the another base station via the wireless connection, such that the offloaded bearer is routed to and from the WTRU via the another base station and the base station, one of the base station and the another base station comprising a relay node, the offloaded bearer being tunneled between the base station and the another base station.

12. The base station of claim 11 wherein the base station is a macro-cell base station and the another base station is a femto-cell base station having a wired connection to the Internet and a mobile operator core network, and the at least one bearer is offloaded via the wired connection of the femto-cell base station.

13. The base station of claim 12 wherein the processor is configured to communicate with the WTRU via a Uu interface and communicate with the another base station via a Un interface, and the at least one bearer is offloaded via the Un interface.

14. The base station of claim 12 wherein the processor is configured to communicate with the WTRU via a Uu interface and communicate with the another base station via an X2 interface, and the at least one bearer is offloaded via the X2 interface.

15. The base station of claim 11 wherein the wireless connection between the base station and the another base station is setup over one or a combination of a licensed frequency, a license-exempt frequency, a TV white space frequency, or a wired interface.

16. The base station of claim 15 wherein the processor is configured to monitor the wireless connection and add, switch, or remove a frequency based on at least one of interference, capacity, demand, or policy.

17. The base station of claim 11 wherein the processor is configured to detect the condition for triggering backhaul traffic offloading based on a backhaul congestion indication received from a mobile operator core network.

18. The base station of claim 11 wherein the processor is configured to maintain mapping of which bearer is sent over which backhaul interface and a portion of bearers of the WTRU are offloaded onto the another base station.

19. The base station of claim 11 wherein the base station is a femto-cell base station having a wired connection to the Internet and a mobile operator core network and the another base station is a macro-cell base station.

20. The base station claim 11 wherein both the base station and the another base station are a femto-cell base station and the at least one bearer is offloaded via a network established among a plurality of femto-cell base stations and a gateway femto-cell base station.

* * * * *